(12) United States Patent
Duval et al.

(10) Patent No.: US 7,708,299 B2
(45) Date of Patent: May 4, 2010

(54) FRAMELESS MODULAR TRAILER

(75) Inventors: Bernard Duval, Vierzon (FR); Scott Boyd, Beaver Dam, WI (US); Joel Nehring, Fox Lake, WI (US); Mark Adams, Beaver Dam, WI (US)

(73) Assignee: Smart Transport Solutions, Fox Lake, WI (US)

( * ) Notice: Subject to any disclaimer, the term of this patent is extended or adjusted under 35 U.S.C. 154(b) by 142 days.

(21) Appl. No.: 11/807,318

(22) Filed: May 25, 2007

(65) Prior Publication Data

US 2007/0285807 A1   Dec. 13, 2007

Related U.S. Application Data

(63) Continuation-in-part of application No. 10/592,495, filed as application No. PCT/FR2004/001259 on May 21, 2004.

(51) Int. Cl.
*B62D 63/00* (2006.01)
*B62D 63/06* (2006.01)

(52) U.S. Cl. .......... 280/401; 280/656; 280/491.1; 280/415.1; 280/204; 280/651; 280/652; 280/789; 296/36; 296/32; 296/186.1; 296/186.4; 296/186.5

(58) Field of Classification Search ............. 280/656, 280/401, 491.1, 415.1, 204, 63, 65.1, 652, 280/789; 296/36, 32, 186.1, 186.4, 186.5
See application file for complete search history.

(56) References Cited

U.S. PATENT DOCUMENTS

| | | | | |
|---|---|---|---|---|
| 1,022,266 A | * | 4/1912 | Saltzman | 296/36 |
| 2,879,072 A | * | 3/1959 | Rear et al. | 280/40 |
| 2,986,401 A | * | 5/1961 | Altadonna | 280/652 |
| 3,141,698 A | * | 7/1964 | Kandle | 296/36 |
| 3,612,600 A | | 10/1971 | Salichs | |
| 3,692,354 A | * | 9/1972 | Tuerk | 296/36 |
| 3,794,375 A | * | 2/1974 | Woodward | 296/36 |
| 3,834,753 A | * | 9/1974 | Heiter et al. | 296/10 |
| 3,837,702 A | * | 9/1974 | Case | 296/36 |
| 3,871,702 A | | 3/1975 | Glassmeyer | 296/36 |
| 3,940,179 A | | 2/1976 | McBride | 296/43 |

(Continued)

FOREIGN PATENT DOCUMENTS

DE   0 235 330 A1   3/1986

(Continued)

OTHER PUBLICATIONS

Office Action; U.S. Appl. No. 10/592,495; Inventor: Bernard Duval; Date: Mar. 31, 2009; pp. 9.

*Primary Examiner*—Lesley Morris
*Assistant Examiner*—Marlon A Arce
(74) *Attorney, Agent, or Firm*—Ryan Kromholz & Manion, S.C.

(57) ABSTRACT

A frameless modular trailer for towing behind a motor vehicle is provided. The trailer is made of slidably coupled extrusions for easy assembly. The front and side panels include a protrusion on the top surface. This protrusion allows for the stacking of additional panels for vary the height of the trailer. Additionally, one of a variety of top panels may be stacked on the front and side panels to multiple configurations for securing objects within the trailer.

19 Claims, 18 Drawing Sheets

U.S. PATENT DOCUMENTS

| | | | |
|---|---|---|---|
| 4,042,275 A | 8/1977 | Glassmeyer et al. | 296/43 |
| 4,067,601 A | 1/1978 | Tuerk | 296/36 |
| 4,427,230 A | 1/1984 | Avny | 296/43 |
| 4,529,220 A | 7/1985 | Wright et al. | |
| 4,582,333 A | 4/1986 | Doering | |
| 4,995,129 A | 2/1991 | Comardo | |
| 5,320,396 A | 6/1994 | Petelka | 296/43 |
| 5,480,180 A * | 1/1996 | Fuller et al. | 280/656 |
| 5,775,711 A | 7/1998 | Floe | 280/405.1 |
| 6,446,414 B1 * | 9/2002 | Bullard et al. | 52/764 |
| 6,511,092 B1 * | 1/2003 | Chepa | 280/656 |
| 6,536,824 B2 * | 3/2003 | Anderson | 296/36 |
| 6,708,995 B2 * | 3/2004 | Norris | 280/204 |
| 6,802,521 B1 * | 10/2004 | Boughton | 280/423.1 |
| 7,097,182 B1 * | 8/2006 | Liu | 280/42 |
| 7,175,205 B2 * | 2/2007 | Simpson | 280/789 |
| 7,455,312 B2 * | 11/2008 | Senatore | 280/491.1 |
| 2003/0193156 A1 * | 10/2003 | Norris | 280/204 |
| 2003/0214117 A1 | 11/2003 | Steins et al. | |
| 2004/0135349 A1 | 7/2004 | Palmer | |
| 2005/0093273 A1 | 5/2005 | McDonell | |
| 2006/0091646 A1 | 5/2006 | Steins | |
| 2007/0262562 A1 * | 11/2007 | Senatore | 280/491.1 |

FOREIGN PATENT DOCUMENTS

| | | |
|---|---|---|
| DE | 100 13 239 A | 1/2001 |
| DE | 10161643 A1 | 7/2003 |
| GB | 2347652 A | 9/2000 |

* cited by examiner

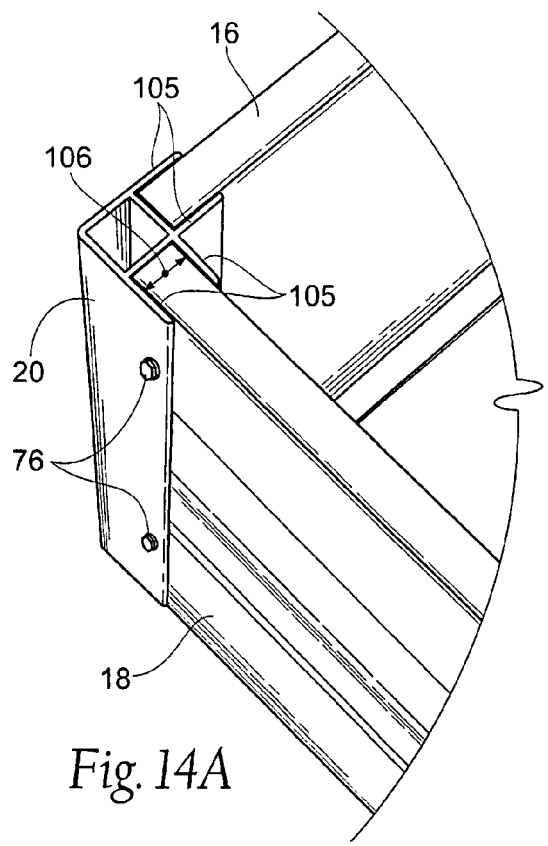
Fig. 14A
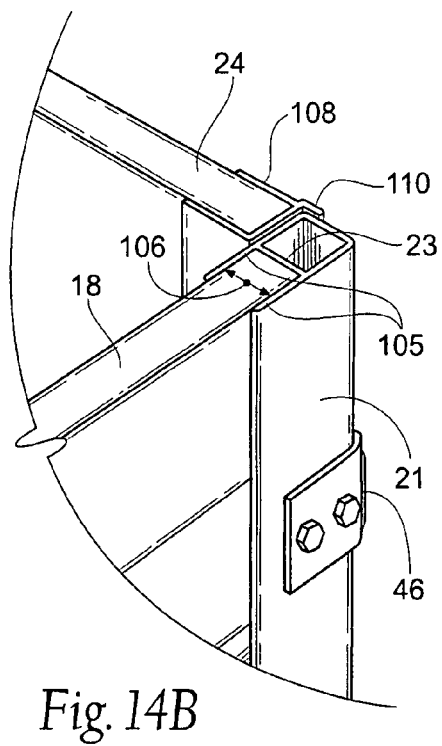
Fig. 14B
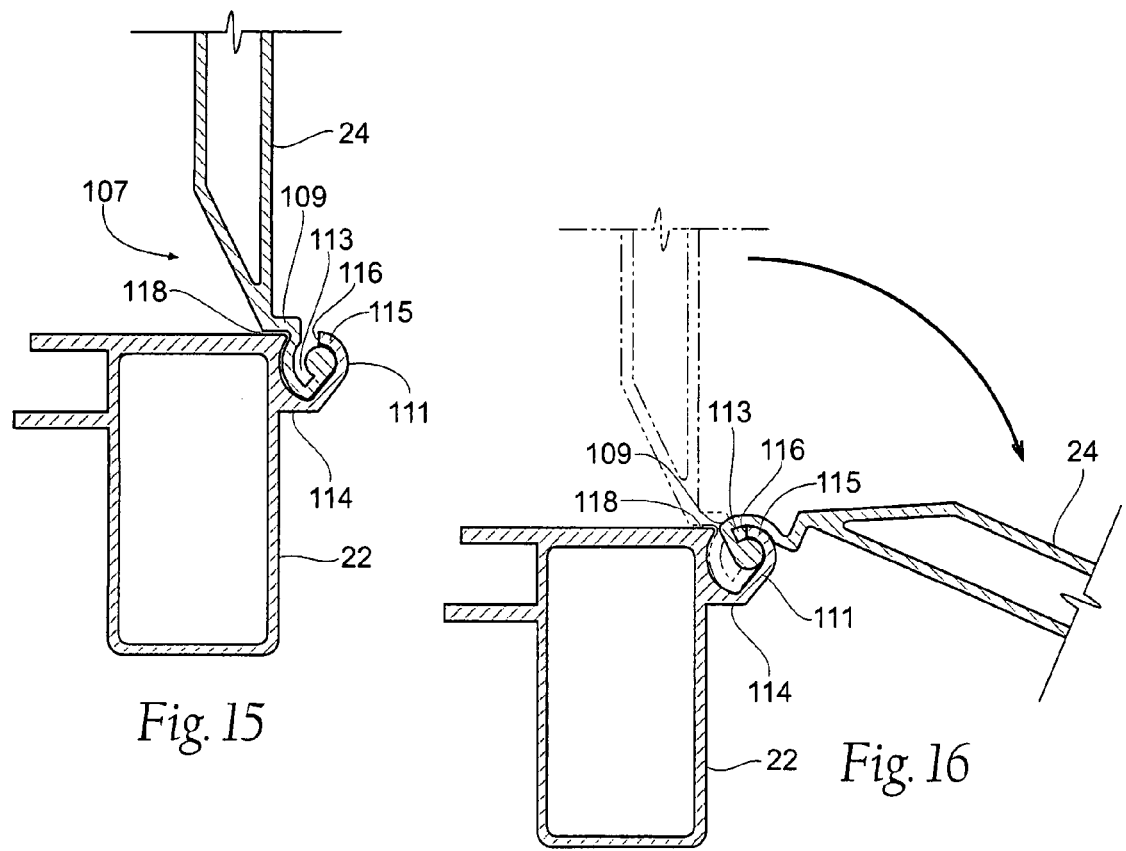
Fig. 15
Fig. 16

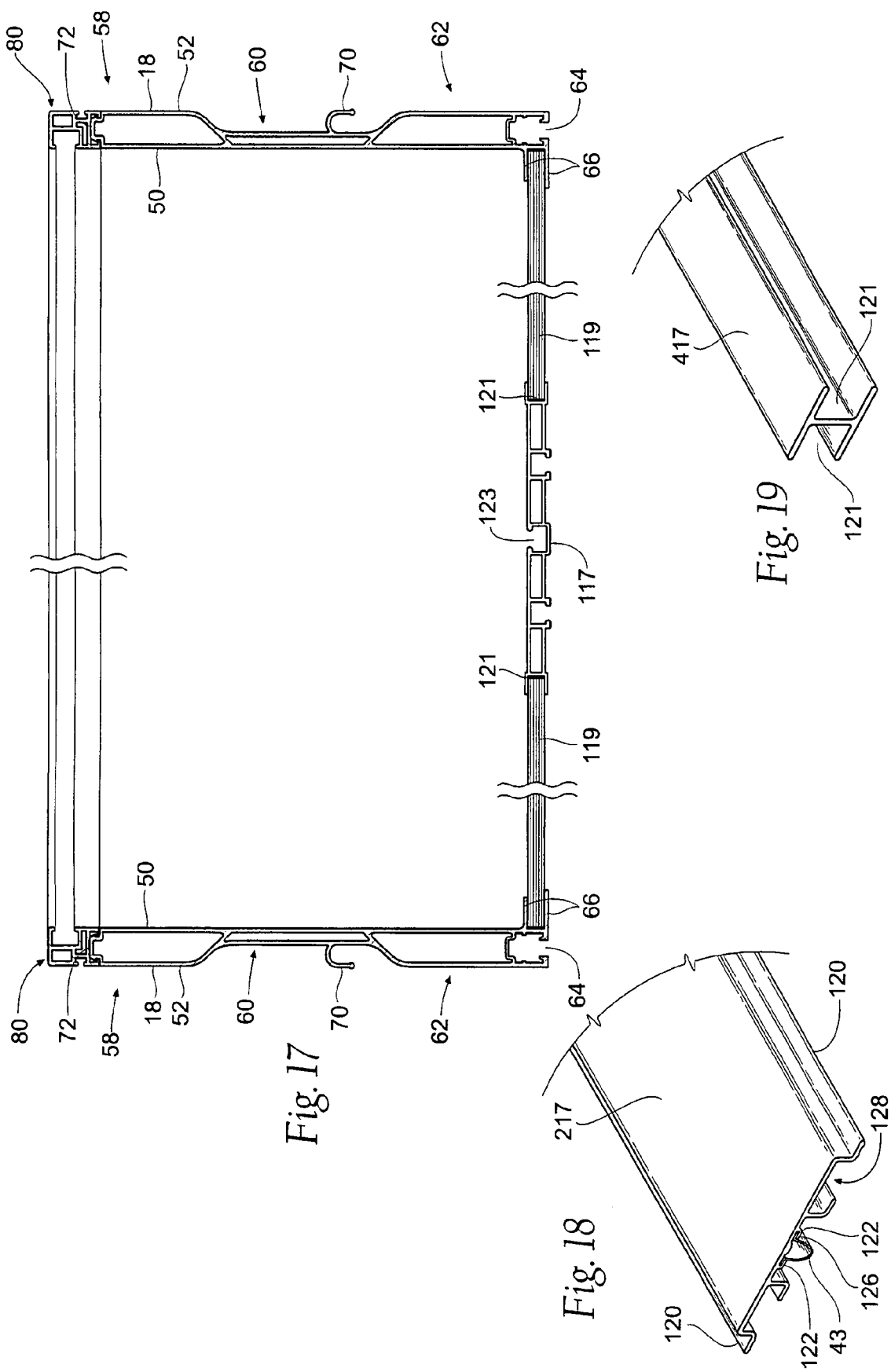

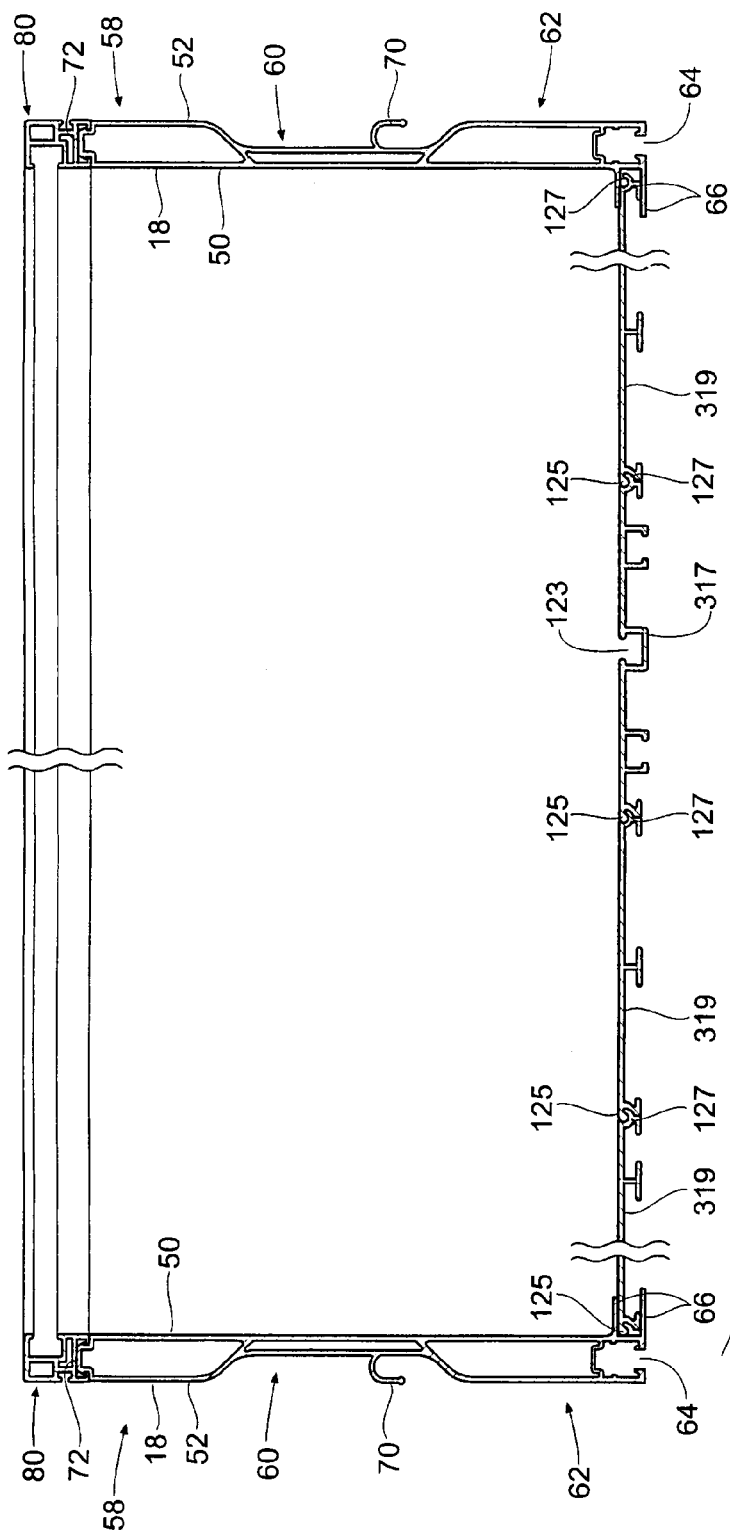
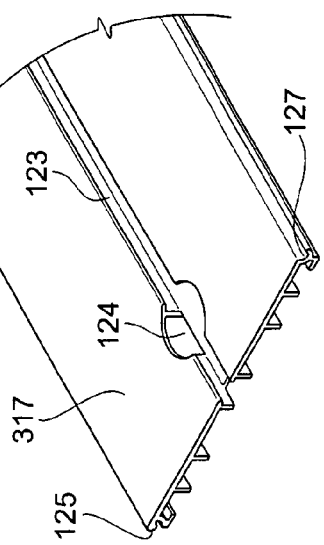
Fig. 20A
Fig. 20B

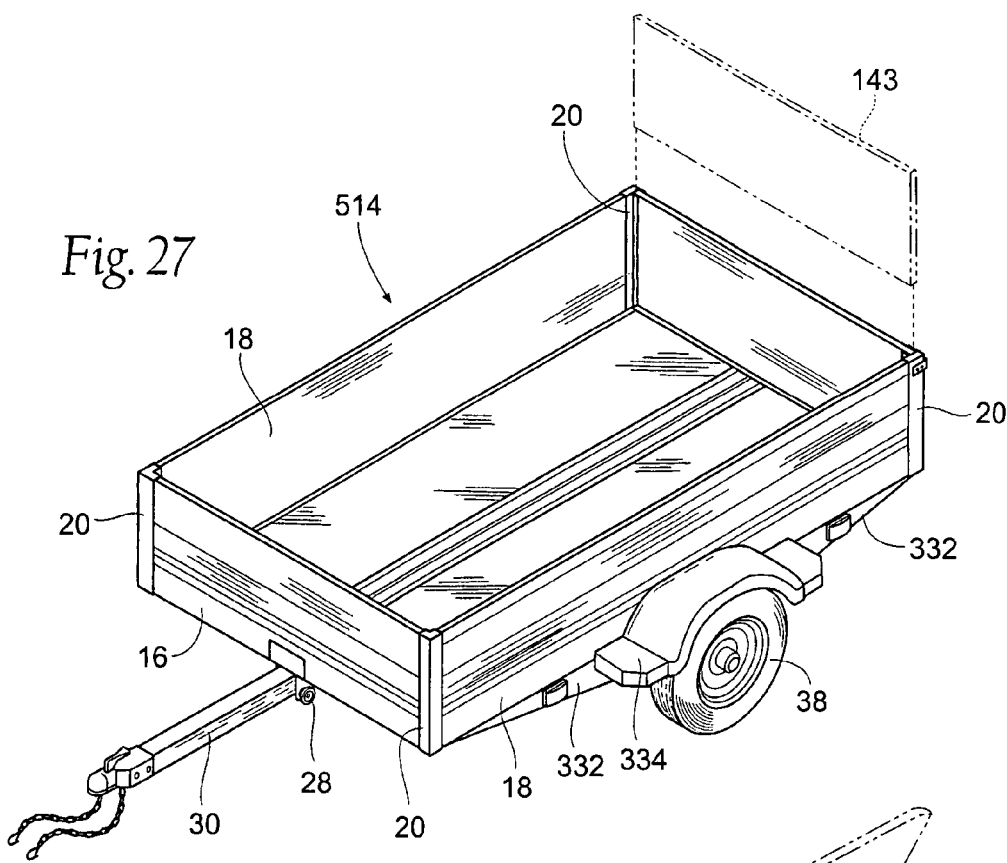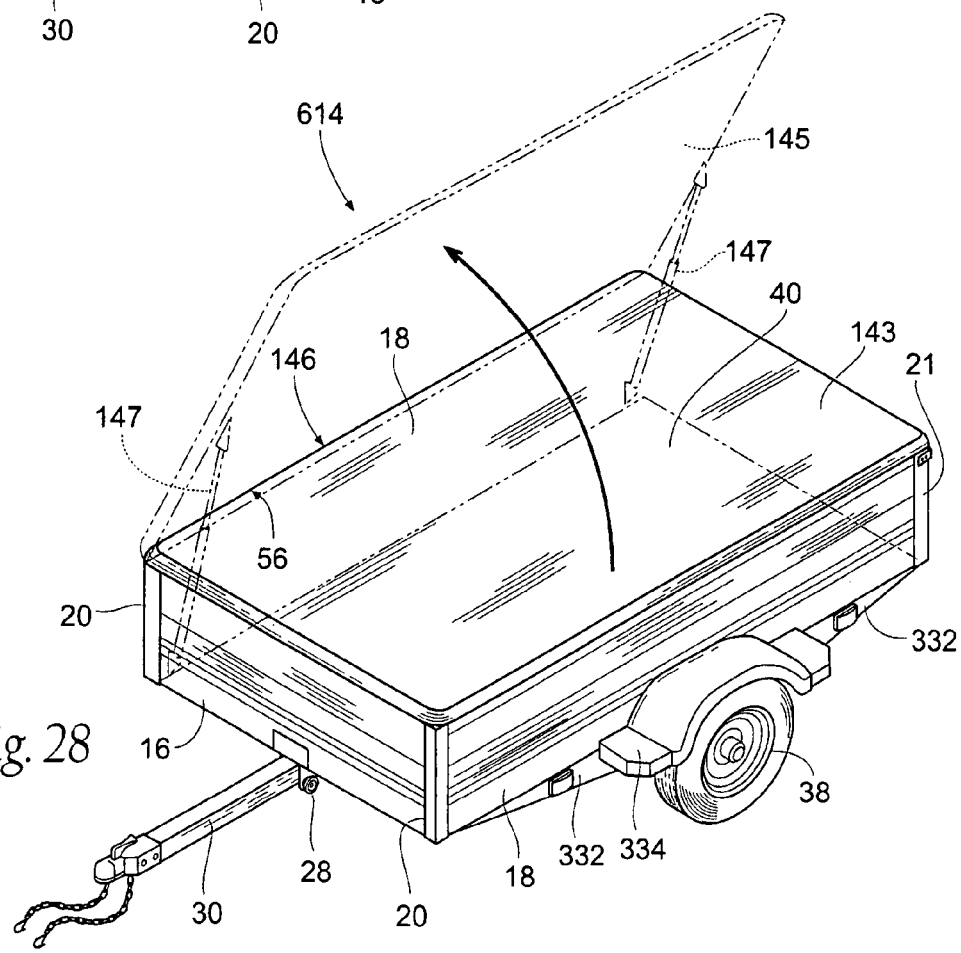

FRAMELESS MODULAR TRAILER

RELATED APPLICATIONS

This application is a continuation-in-part of U.S. patent application Ser. No. 10/592,495, filed Jun. 7, 2007 which is a 371 of PCT/FR2004/001259 filed 21 May 2004.

BACKGROUND OF THE INVENTION

The present invention pertains to trailers intended to be towed by a motor vehicle. These trailers may be used for a variety of purposes including transporting luggage, materials, or sports machines. Such trailers are generally made from metal beams cut to the correct length and welded together. These operations, particularly the welding operation, require welding stations and qualified personnel. Such operations can only be conducted in workshops equipped with specific tooling. Often this tooling is expensive and requires trained workers to operate the tooling. The trailers must then be transported to consumers in an assembled state, which is difficult and costly. It is therefore desired to design a new trailer which requires a minimum number of tools for assembly. It is further desired to design a new trailer which does not require skilled workers, such as welders, to assemble the trailer. It is further desired to design a new trailer which can be assembled on site at the point of sale to reduce the logistical problems associated with transporting the trailers in their assembled configuration.

SUMMARY OF THE INVENTION

The invention provides a frameless modular trailer. The trailer of the present invention includes a front panel and two opposed side panels. The front and side panels are slidably coupled by a pair of corner posts. The trailer further includes a floor panel which is slidably engaged by the front and side panels.

The trailer may include a bumper coupled to the floor panel and a hinged ramp slidably coupled to the bumper.

The trailer may include a top panel which is slidably engaged by any of the front or side panels.

The front and side panels may be formed with a protrusion on the top surface. The top panel may be formed with a channel formed on the bottom surface. The protrusions of the front or side panels may be slid in the channel of the top panel to slidably engage the top panel to either a front or side panel.

The front and side panels may be formed with a bolt channel on the bottom surface. A bolt may be slid in this bolt channel. The bolt channel is adapted to engage the head of the bolt so that the bolt cannot rotate within the bolt channel. In this manner a nut can be threaded onto the bolt and items may be attached to the front or side panels by tightening a nut onto the bolt without access to the head of the bolt.

The trailer may include a floor panel which is made of numerous slidably engaged planks. The floor panel may be formed with a channel for securing objects within the trailer.

The inside and outside surfaces of the front, side, and top panels may be formed with bolt channels for engaging bolts or channels for securing objects within the trailer.

BRIEF DESCRIPTION OF THE DRAWINGS

FIG. 14A is an enlarged perspective view of the area designated generally by reference numeral 14A of FIGS. 5D and 7A.

FIG. 14B is an enlarged perspective view of the area designated generally by reference numeral 14B of FIG. 7A.

FIG. 15 is a close up cross sectional view taken along line 15 of FIG. 3 and showing the hinged engagement of the ramp and bumper sections of a preferred embodiment of present invention with the ramp in the upright closed position.

FIG. 16 is a close up cross sectional view similar to that of FIG. 15 and showing the hinged engagement of the ramp and bumper sections of a preferred embodiment of present invention with the ramp in the downward opened position, and showing the upright ramp in phantom.

FIG. 17 is a cross sectional view taken along line 17 of FIG. 7A.

FIG. 18 is a fragmentary perspective view of an alternative embodiment splice channel according to the present invention, for use in the frameless trailer of FIG. 17.

FIG. 19 is a fragmentary perspective view of an alternative embodiment of a splice channel according to the present invention, for use in the frameless trailer of FIG. 17.

FIG. 20A is a cross sectional view similar to that of FIG. 17, but showing an alternative embodiment including alternative flooring.

FIG. 20B is a fragmentary perspective view of a splice panel for use in the embodiment shown in FIG. 20A.

FIG. 27 is a perspective view of an alternative embodiment of the frameless trailer of the present invention including a slidably attached back panel which is slidably attached.

FIG. 28 is a perspective view of an alternative embodiment of the frameless trailer of the present invention and showing a hingedly attached trailer cover in phantom in the open position.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

The invention contemplates the assembly of various cooperating components fabricated from extruded materials such as aluminum. The components feature releasably, slidably engagable profiles. For example, the ability to assemble two components by hand, or only requiring basic tools, and providing such positive engagement that the components will not separate absent an applied sliding longitudinal force. The extruded components may also feature profiles that allow the user to secure items to the trailer.

Figure 1:
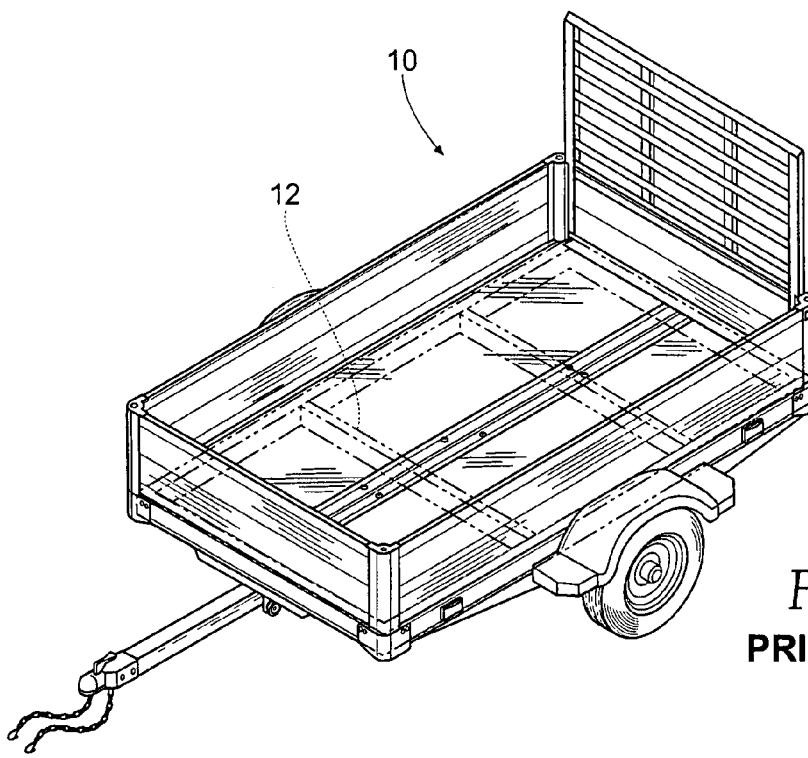
FIG. 1 is a perspective view of a prior art trailer.

FIG. 1 is a drawing of a prior art modular trailer 10. The prior art modular trailer 10 includes a frame 12 which is bolted together.

Figure 2:
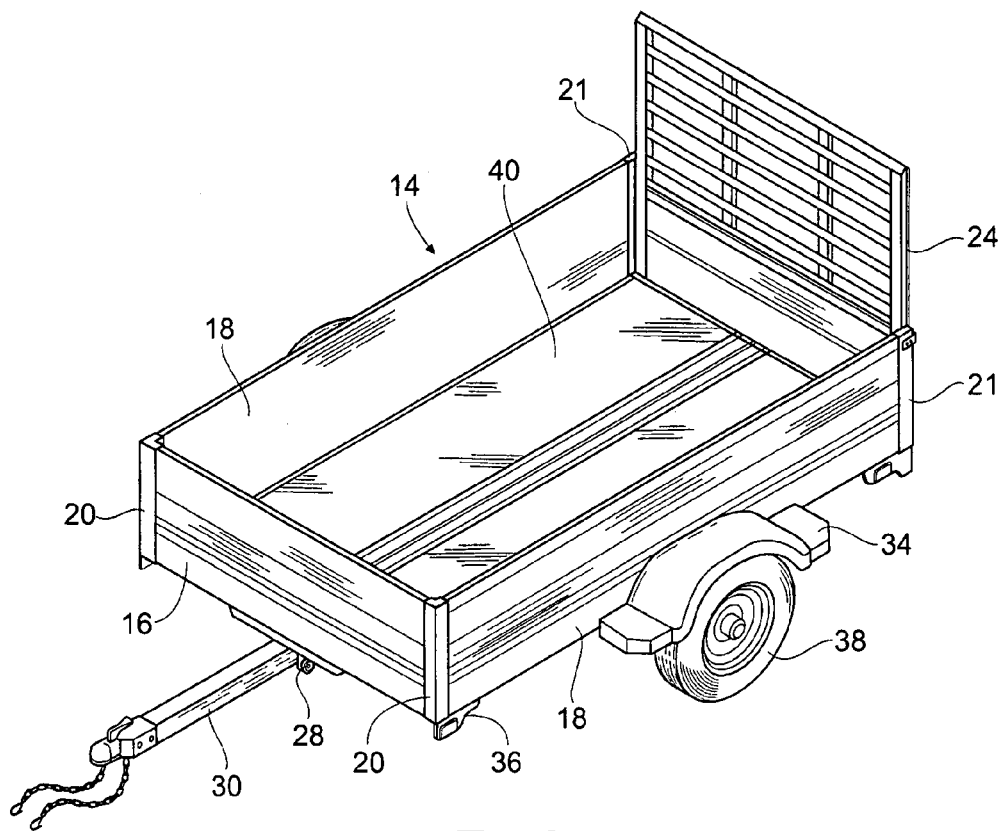
FIG. 2 is a perspective view of an embodiment of frameless trailer of the present invention.
Figure 3:
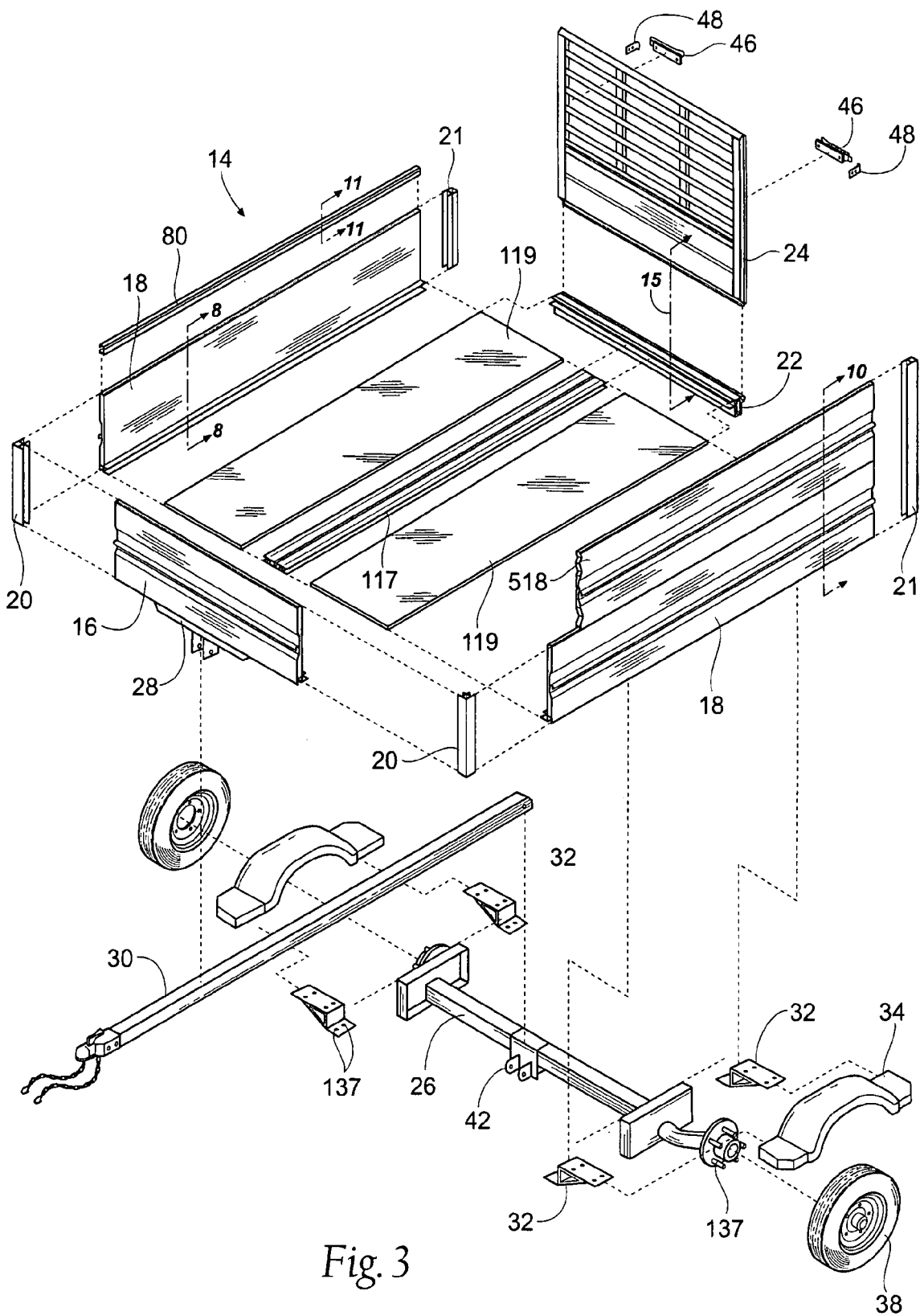
FIG. 3 is an exploded view of an embodiment of frameless trailer of the present invention.

FIGS. 2 and 3 show a modular frameless trailer 14 according to the present invention. The trailer 14 comprises numerous interlocking extrusions which are slid together and secured to form a frameless trailer 14. The trailer 14 preferably includes a front panel 16, at least two spaced apart opposed side panels 18, corner posts 20, 21, a bumper 22, a rear panel 24, an axle 26, a pair of tongue brackets 28, 42, a tongue 30, fender brackets 32, fenders 34, corner wraps 36, tires 38 and floor 40. This configuration allows a number of extrusions to be produced, cut to size, and pre-drilled with holes. The parts can then be shipped, unassembled, to be assembled by the customer or the retailer. This allows for more efficient shipping and storage of the trailers 14.

Figure 4:
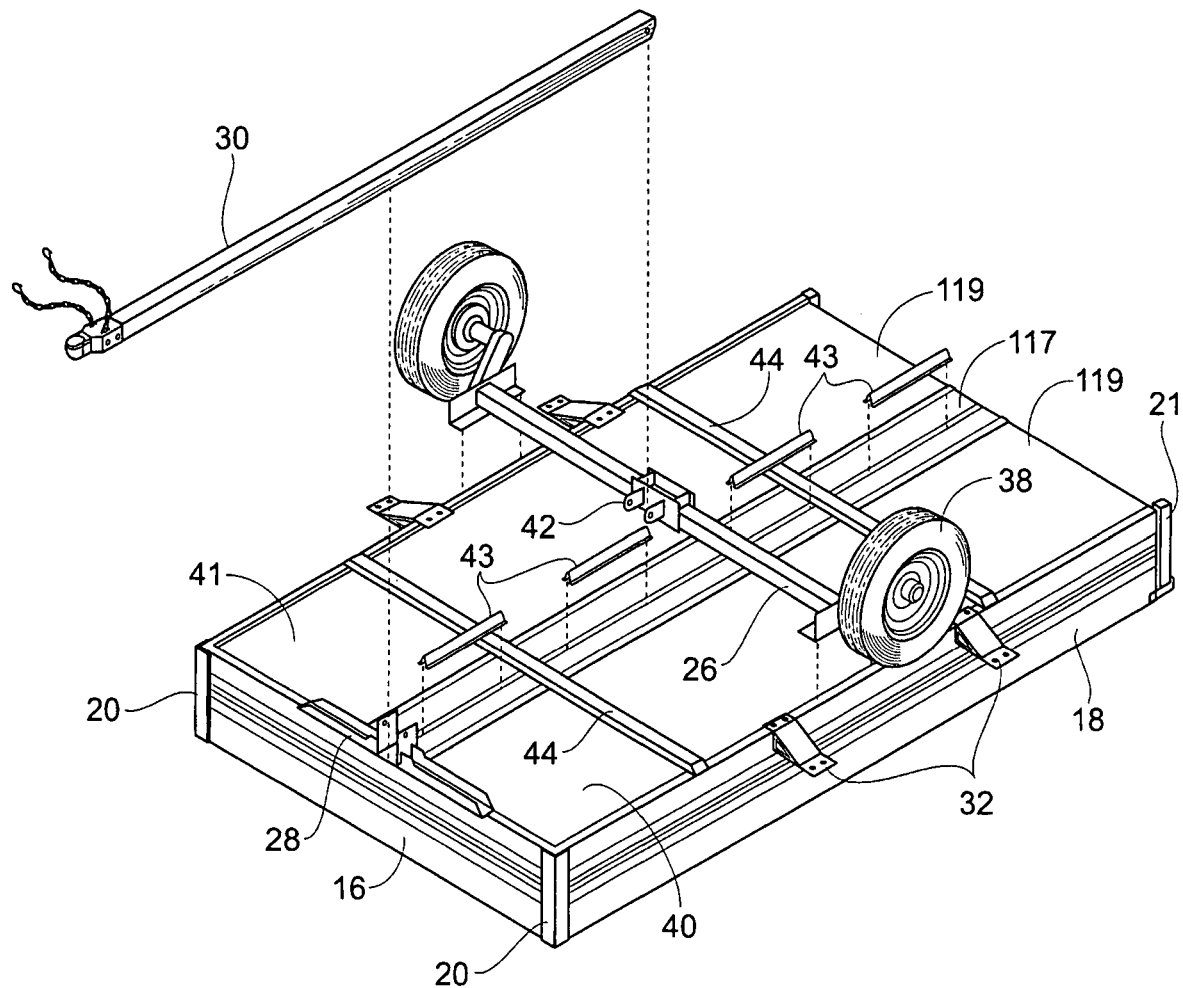
FIG. 4 is a partially exploded, bottom perspective view of the frameless trailer of FIG. 2.

FIG. 4 shows the underside 41 of the trailer 14. In a preferred embodiment of the invention, the tongue 30 is secured to the trailer 14 by a pair of tongue brackets 28, 42. As seen, the first tongue bracket 28 is attached to the front panel 16. The second tongue bracket 42 is attached to the axle 26. The preferred embodiment of the trailer 14 preferably includes three cross members; the axle 26 and two additional cross members 44, however it is contemplated that any number of cross members 44 could be utilized. The underside of the trailer may further include a plurality of wire guides 43 attached to the floor 40, as will be described in further detail below.

Figure 5A:
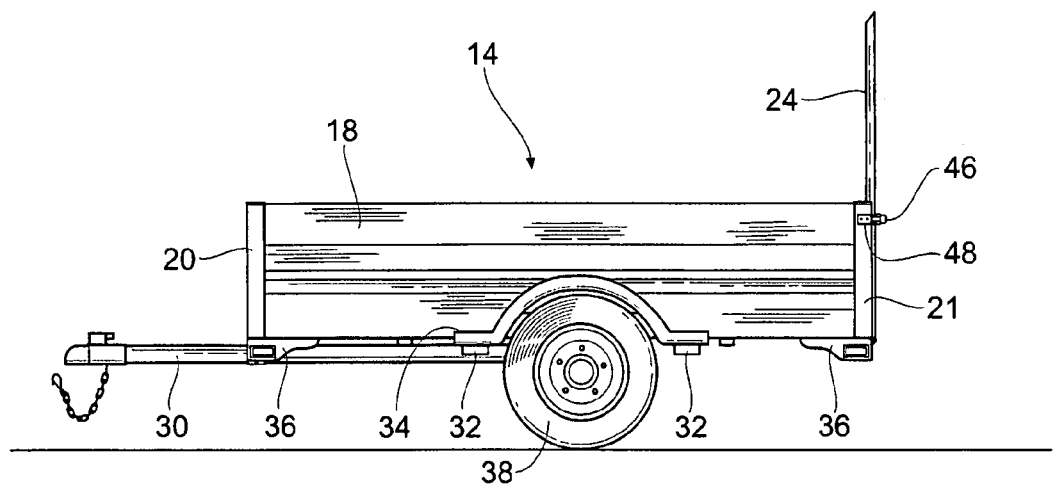
FIG. 5A is a side elevation view of the frameless trailer of FIG. 2 with its ramp locked in the up position.
Figure 5B:
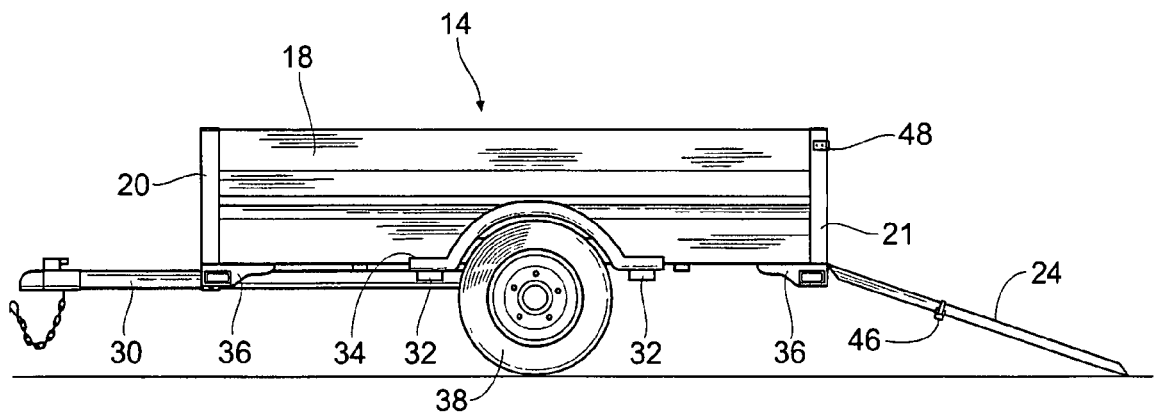
FIG. 5B is a side elevation view of the frameless trailer of FIG. 2 with its ramp in the down position.
Figure 5C:
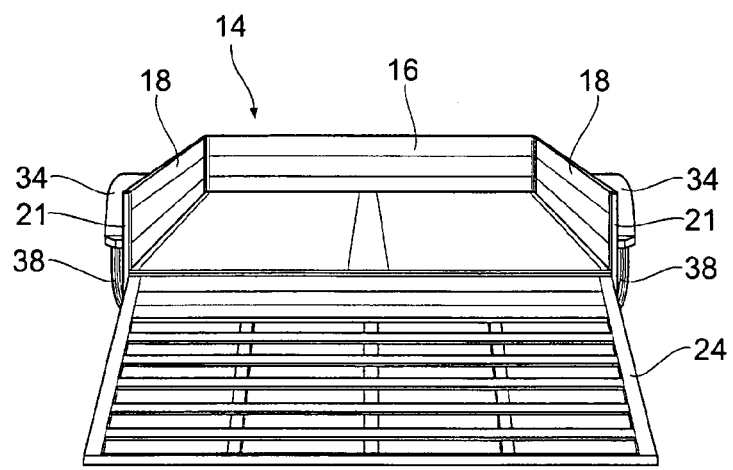
FIG. 5C is a rear perspective view of the frameless trailer of FIG. 2 with its ramp in the down position.
Figure 29:
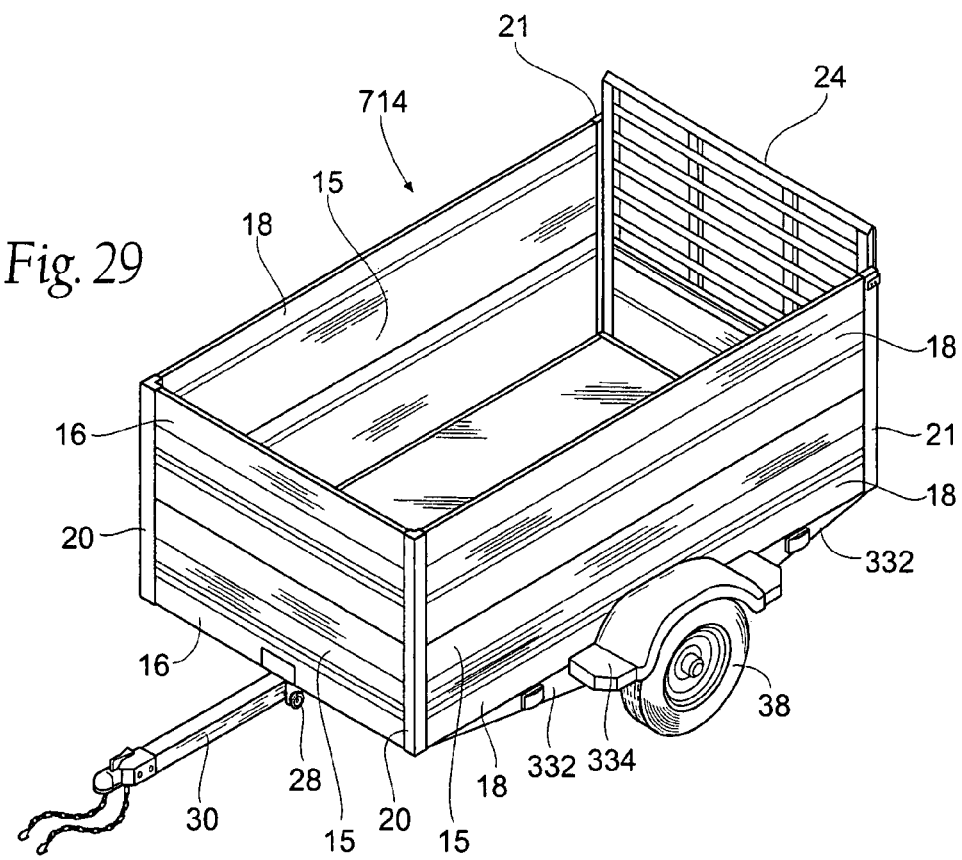
FIG. 29 is a perspective view of an alternative embodiment of the frameless trailer of the present invention including multiple, slidably engaged side panel extrusions.

In the preferred embodiment of the trailer 14 the rear panel is a pivoting ramp 24. FIGS. 5A and 5B show the operation of the pivoting ramp 24. As shown in FIG. 5A, the ramp 24 is secured in its upright position by a pair of latches 46 attached to the either end of the ramp 24 and a pair of catches 48 attached to the rear corner posts 21. The latches 46 and catches 48 are shown in more detail in FIG. 3. When the latches 46 are released from the catches 48, the ramp 24 can be pivoted to its downward position, as shown in FIG. 5B. Although the ramp 24 in FIGS. 5A is shown as being taller than the side panels 18, it is also contemplated that the ramp 24 could be of any height. For example, as shown in FIGS. 7A and 29, the ramp 24 could be generally the same height as the side panels 18.

Figure 5D:
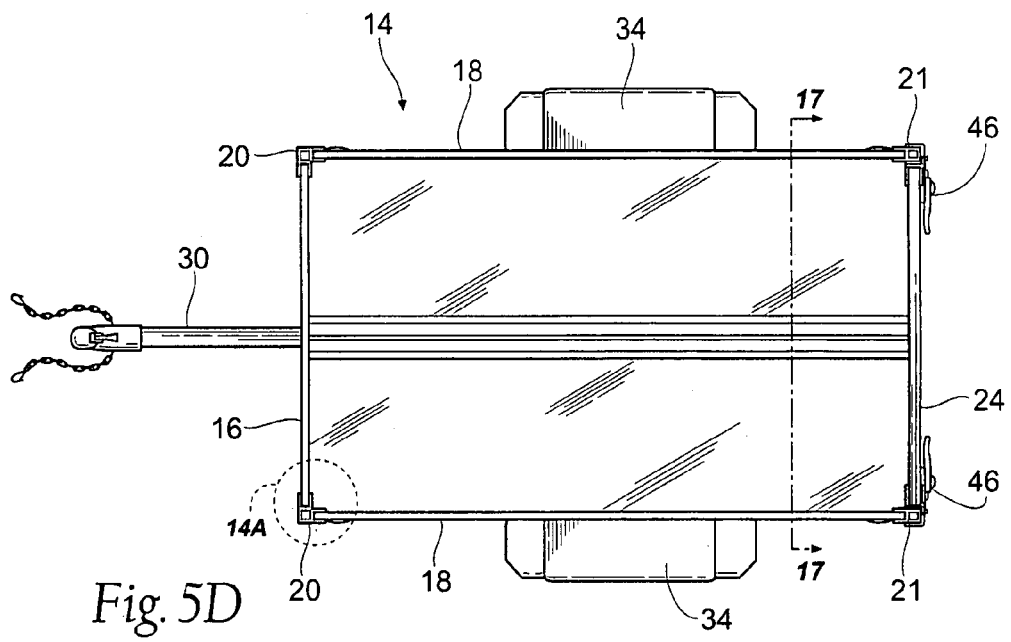
FIG. 5D is a top plan view of the frameless trailer of FIG. 2.
Figure 5E:
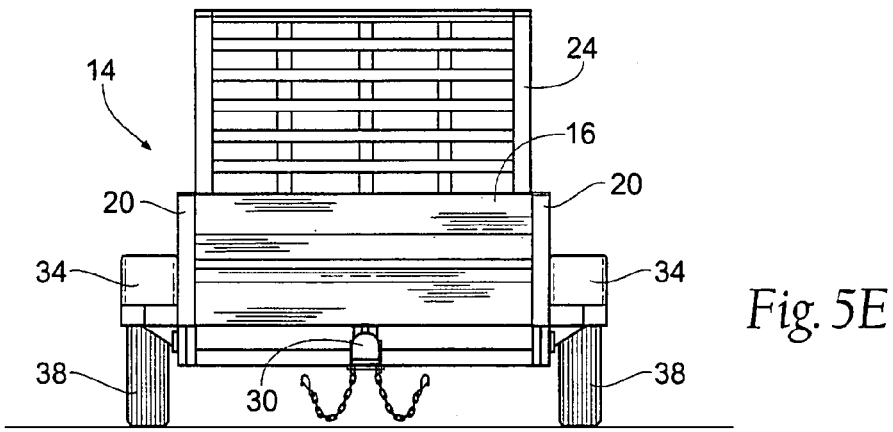
FIG. 5E is a front elevation view of the frameless trailer of FIG. 2.

FIGS. 5D and 5E show a top view and a front view respectively of the preferred embodiment of the frameless trailer 14 of the present invention.

Figure 6:
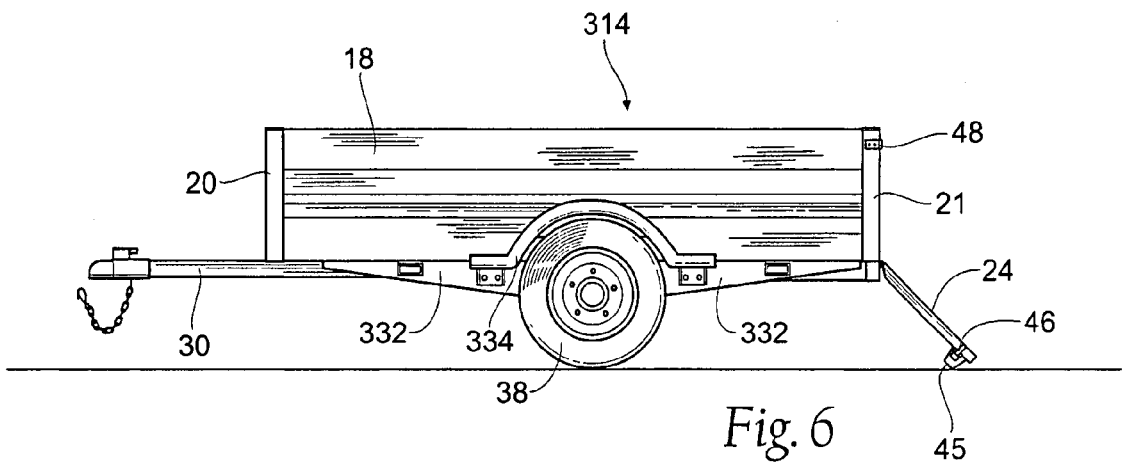
FIG. 6 is a side elevation view of an alternative embodiment of the frameless trailer of the present invention, and showing the ramp in the down position.

FIG. 6 shows an alternative embodiment of the trailer 314 with its ramp 24 in the downward position. This embodiment of the trailer 314 does not include the corner wrap pieces 36 as shown in FIGS. 5A and 5B. Instead, the trailer 314 utilizes an alternative embodiment of fender brackets 332 and fenders 334, as will be described in more detail below. Further, the trailer 314 utilizes a shortened ramp 24. The shortened ramp may include at least one bumper 45. The bumper 45 is adapted to engage the ground when the ramp 24 is in its down position. The bumper 45 may be made of any material, however in the preferred embodiment the bumper 45 is made of a rubber material.

Figure 7A:
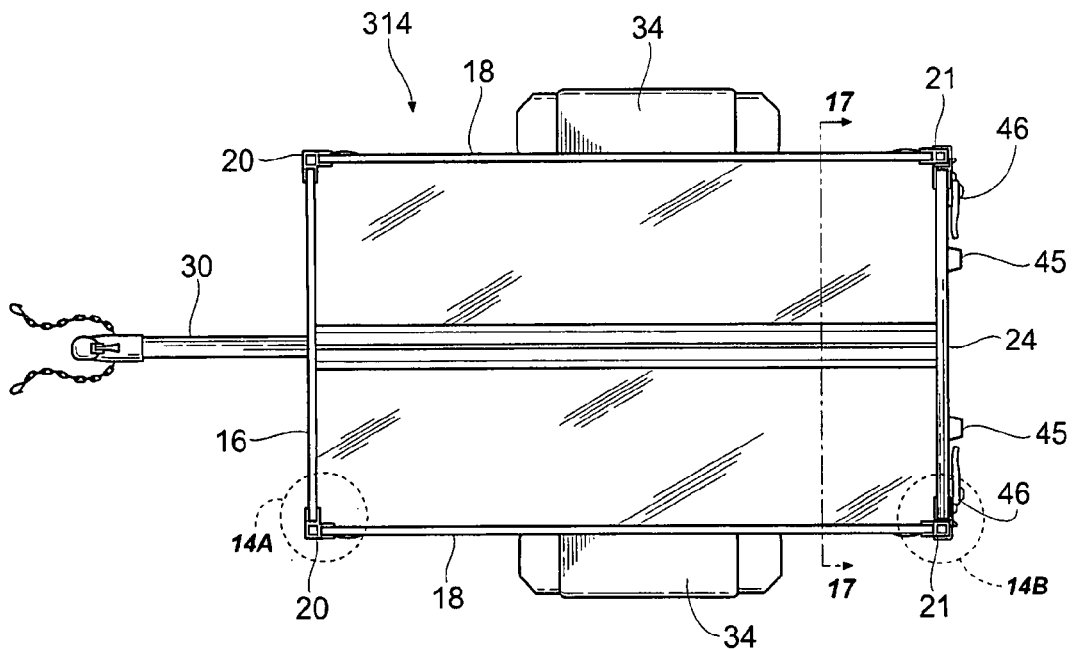
FIG. 7A is a top view of the frameless trailer of FIG. 6.
Figure 7B:
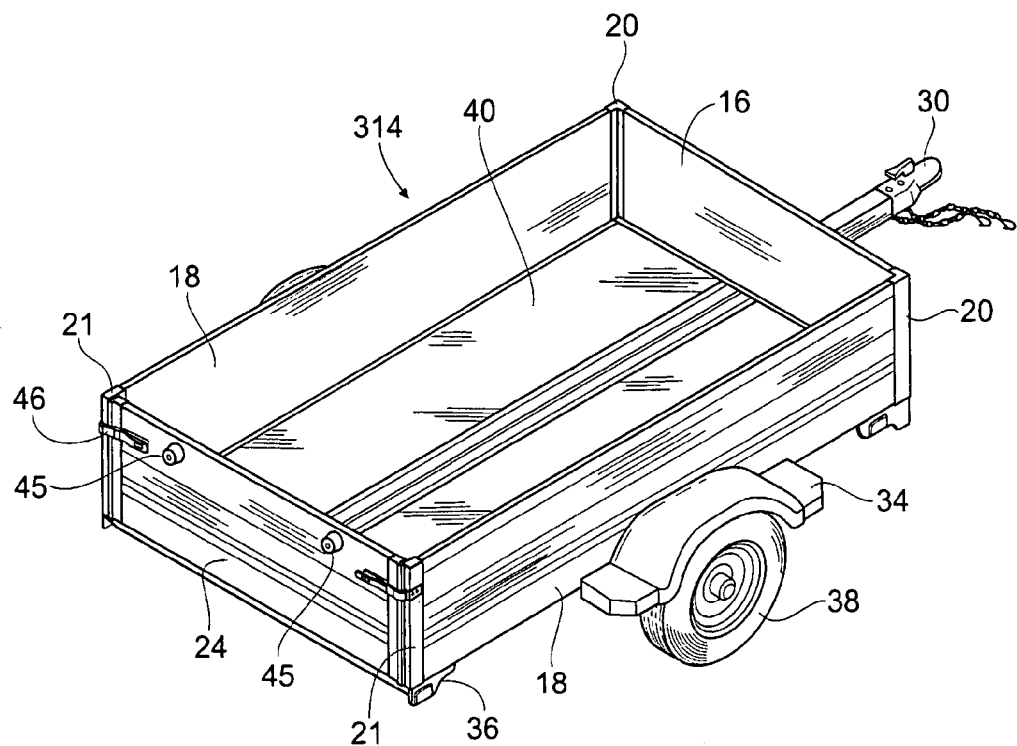
FIG. 7B is a perspective view of the frameless trailer of FIG. 6.

FIGS. 7A and 7B show an alternative views of the trailer of FIG. 6. The frameless trailer of FIGS. 7A and 7B is similar to the embodiment shown in FIGS. 5A to 5E, however this alternative embodiment includes a shortened ramp 24. The frameless trailer may further include at least one bumper 45.

Figure 8:
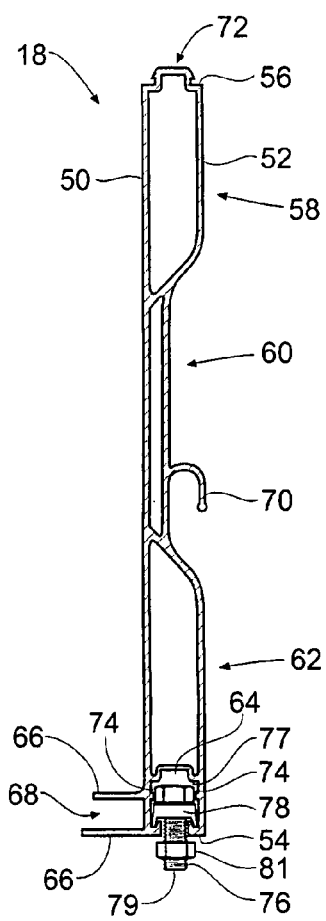
FIG. 8 is a cross sectional view taken along line 8-8 of FIG. 3 and showing a side panel extrusion for use in the frameless trailer.
Figure 9:
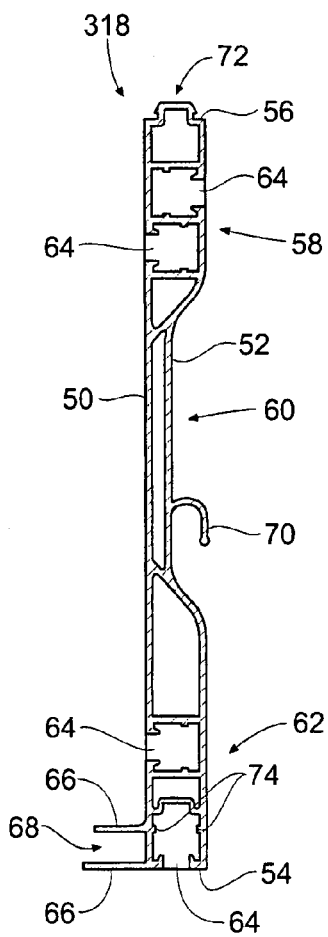
FIG. 9 is a cross sectional view similar to that of FIG. 8, but showing an alternative embodiment of a side panel extrusion for use in the frameless trailer of the present invention.
Figure 10:
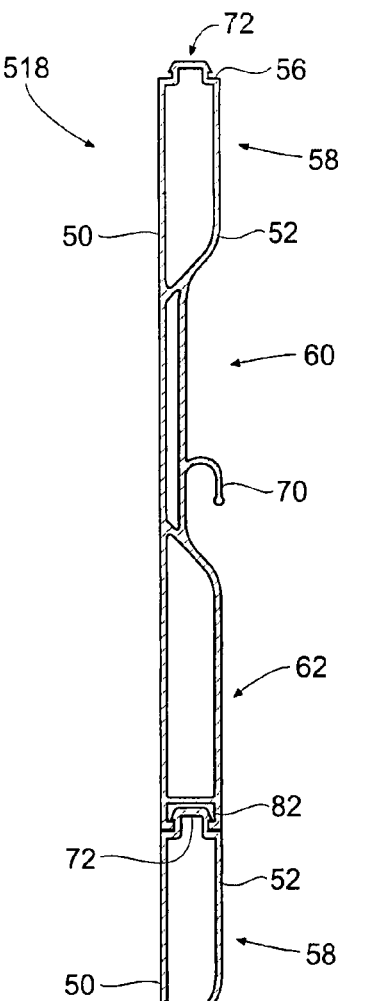
FIG. 10 is a cross sectional view taken along line 10-10 FIG. 3 and showing multiple side panels slidingly engaged for use in the frameless trailer.

FIGS. 8-10 show cross sectional views of various front and side panel extrusions 16, 18. Although only the side panel extrusions 18 are shown and described it should be understood that the front panel extrusions 16 may have the same configuration. As shown, the side panel extrusions 18 have an inner face 50, an outer face 52, a bottom edge 54 and a top edge 56. As seen in the cross sectional views of FIGS. 8-10, the preferred embodiments of the side panel extrusion 18, 318, 518 have three sections, a top section 58, a center section 60, and a bottom section 62. The top section 58 and the bottom section 62 have generally the same thickness, with the center section 60 having a relatively smaller thickness. The inner face 50 is generally planar. As seen in FIG. 9, the inner face 50 may have at least one bolt channel 64 formed on the surface thereof. This bolt channel 64 is adapted to engage a bolt 76 with a bolt retainer 78. (See particularly FIG. 8.) The bolt retainer 78 is generally rectangular and includes an aperture (not shown) therethrough for the bolt 76.

In the alternative embodiment of a side panel extrusion 318 shown in FIG. 9, the inner face 50 is formed with two bolt channels 64, the first bolt channel 64 located in the top section 58 of the panel 318 and the second bolt channel 64 located in the bottom section 62 of the panel 318. These bolt channels 64 may be used to secure components to the side panels 318. A benefit of this design is that the components can be secured with bolts 76 using one side tightening. That is, as seen in FIG. 8, a bolt 76 with an attached bolt retainer 78 can be slid into the bolt channel 64 formed on the bottom surface 54 of the panels 18. The head 77 of the bolt 76 is held in a nonrotatable position by the interior flanges 74 formed in the bolt channel 64. A nut 81 can then be threaded onto the free end 79 of the bolt 76. Because the head 77 of the bolt 76 cannot rotate, the nut 81 can be fastened on the bolt 76 with access to only the free end 79 of the bolt 76.

As seen in FIGS. 8 to 10, at least one flange 66 is formed near the bottom of the inner face 50. This flange 66 extends generally perpendicularly to the surface of the inner face 50 and extends along the length of the panel 18, 318. In the preferred embodiment two spaced apart flanges 66 extend along the length of the panel 18, 318. These two flanges 66 form a channel 68 into which the floor panel of the trailer 14 can be slid, as shown in FIGS. 17 and 20A and described in more detail hereinafter. This double flange 66 provides full encapsulation of the floor 40 with no through panel fasteners required. In an alternative embodiment (not shown), a single flange 66 may be utilized, and the floor panel 40 of the trailer 14 can be dropped into place and will rest upon the single flange 66. The single flange 66 design would be preferable in embodiments in which planks, such as wood planks are utilized for the floor 40 of the trailer 14.

In a preferred embodiment, the outer surface 52 of the panel 18, 318, 518 is sloped between the upper section 58 and the center section 60, and again between the center section 60 and the bottom section 62. A longitudinally extending hook 70 may be integrally formed to the surface 52. The hook 70 may extend laterally from the outer surface 52 and run coextensive the length of the outer surface 52 of the center section 60. This hook 70 is designed to accept and anchor all forms of tie downs and bungee cords (not shown). As may be seen particularly in FIG. 9, the outer surface 52 of the top section 58 of the panel 318 may be formed with a bolt channel 64 adapted to engage a bolt 76 with a lock 78 as described above. This bolt channel 64 could be used to attach various items to the panel extrusions, such as the rubber bumpers 45 shown in FIGS. 6 and 7B. To attach the bumpers 45 to a panel extrusion 318, a bolt 76 may be slid into the bolt channel 64. The bumper 45 may then be attached to the end of the bolt 76, for example by placing the bumper 45 on the bolt 76 and threading a nut on the end of the bolt 76.

The top edges 56 of the panel extrusions 18, 318, 518 may be formed to include an interlocking protrusion 72. This interlocking protrusion 72 allows the stacking of multiple side panels 18, 318, 518 as shown in FIG. 10 as well as top panels 80, 380, 580 as will be described below. Because different side panels 18, 318, 518 may have different integrated features, such as the bolt channel 64, and tie down hook 70, any number of different panels 18, 318, 518 could slidingly interlocked to achieve the desired panel height and combination of features, as seen in FIG. 10. As will be described in more detail below, various top panels 80, 380, 580 can be slidingly interlocked with the panel extrusions 18, 318, 518. The interlocking protrusion 72 extends along the length of the panel extrusion 18, 318, 518 along the top edge 56 and is adapted to be retained within a corresponding engaging channel 82 formed in a second panel 518 to slidably couple the two panels 18, 518 as shown in FIG. 10.

The respective bottom edges 54 of the panel extrusions 18, 318 may be formed to include a bolt retaining bolt channel 64. The bolt retaining bolt channel 64 has a similar configuration to the bolt channel 64 described above with respect to the inner face 50.

Figure 11:
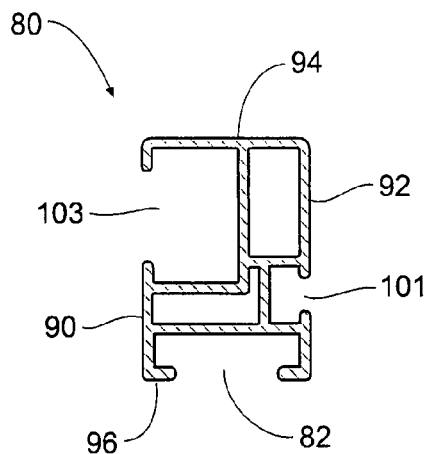
FIG. 11 is a cross sectional view taken along line 11-11 of FIG. 3 and showing top panel extrusion for use in the frameless trailer.
Figure 12:
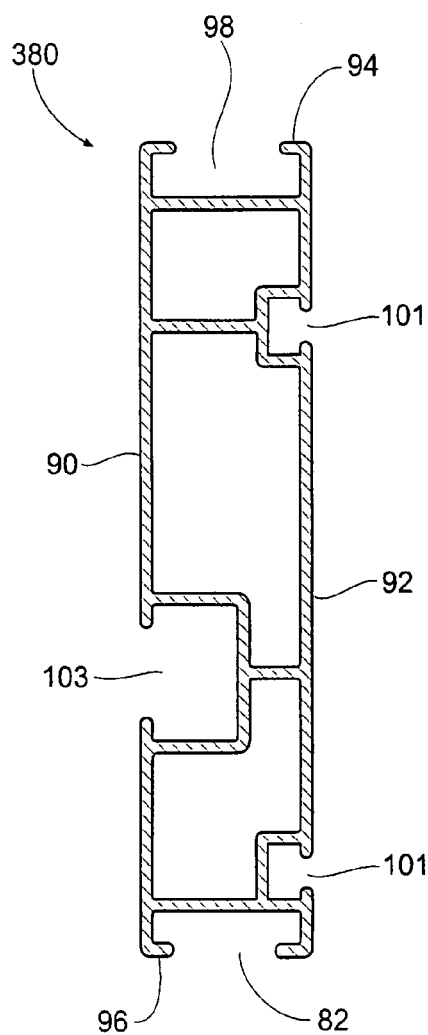
FIG. 12 is a cross sectional view similar to that of FIG. 11, but showing an alternative embodiment of a top panel extrusion for use in the frameless trailer.
Figure 13:
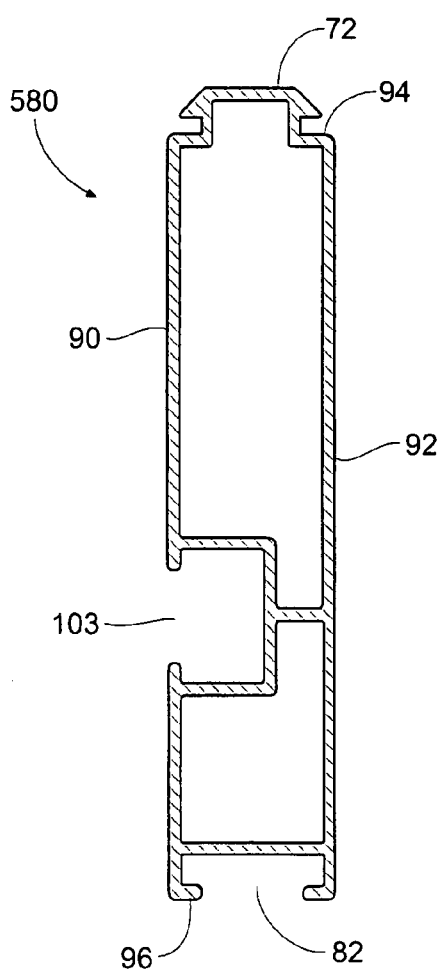
FIG. 13 is a cross sectional view similar to that of FIG. 11, but showing an alternative embodiment of a top panel extrusion for use in the frameless trailer.

The trailer 14 may also include a top panel extrusion 80, 380, 580 which is adapted to slidingly engage the side panel 18, 318, 518 and front panel 16 extrusions. A variety of top panel extrusions 80, 380, 580 may be seen in FIGS. 11-13. As illustrated, the top panel extrusions 80, 380, 580 preferably include an inner face 90, an outer face 92, a top edge 94 and a bottom edge 96. The top panels 80, 380, 580 may have a flat top surfaces 94 as shown in FIG. 11, channels 98 formed on the top surfaces 94 as shown in FIG. 12, or interlocking protrusions 72 formed on the top surfaces 94 as shown in FIG. 13. The bottom edges 96 of each of the top panel extrusions 80, 380, 580 are preferably formed with engaging channels 82 for engaging the interlocking protrusions 72 of a side panel 18, 318. The respective inner faces 90 and outer faces 92 of the top panel extrusions 80, 380, 580 are generally planar and may be formed with any number of channels 101, 103. These channels 101, 103 may be used to secure the items within the trailer 14.

The trailer 14 of the present invention may also utilize a plurality of corner posts. FIG. 14A shows a front corner post 20 connecting the front panel 16 to a side panel 18. This view shows a front corner of the trailer 14 shown in FIG. 7A. The corner post 20 has a generally square cross section, with two flanges 105 extending from each of two adjacent faces. Each set of flanges 105 defines a channel 106 which engages a panel extrusion 16, 18 as will be described in greater detail below.

FIG. 14B shows a rear corner post 21 attached to a side panel 18. This view shows a rear corner of the trailer 14 shown in FIG. 7A. The rear corner piece has a generally square cross section, with a pair of spaced apart flanges 105 extending laterally from one of the faces 23 of the square. The pair of flanges 105 defines a channel 106 therebetween which is adapted to engage a panel extrusion 18 as will be described in greater detail below. As may be further seen in the view of FIG. 14B, is also contemplated that the ramp 24 could include an end cap 108 at each end thereof. The end cap 108 generally comprises a U-shaped extrusion, wherein an end cap 108 is adapted to be placed over each end of the ramp 24. The end cap 108 may further include a protrusion 110. The protrusion 110 prevents the ramp 24 from being pivoting past its closed position and into the trailer. As is best seen in FIG. 7, a preferred embodiment of the trailer 14 includes both front corner posts 20 and rear corner posts 21. This is because the preferred embodiment of the trailer 14 includes a rear panel 24 which is pivotably attached rather than slidably attached. In an embodiment in which the rear panel is slidably attached, as shown in FIG. 27, four front corner posts 20 will be utilized.

As shown in FIG. 3, a preferred embodiment of the frameless trailer 14 includes a pivoting ramp extrusion 24 opposite the front panel 16 of the trailer 14. The operation of the pivoting ramp extrusion 24 is shown in FIGS. 15 and 16. The ramp extrusion 24 is similar in to the extrusion panels 16, 18 described above, however the ramp extrusion 24 includes an integrated pivot member 109. In the preferred embodiment, the bottom section 107 of the ramp extrusion panel 24 is tapered, with the outer face 52 remaining generally planar. The integrated pivot member 109 extends from the tapered end 107 of the ramp extrusion 24. As is seen in FIG. 15, the pivot member 109 includes a pivot channel 113.

The bumper extrusion 22, which is attached to the trailer 14 as described hereinafter, includes a frame channel 111. The frame channel 111 hingedly engages the pivot member 109. In the preferred embodiment, the frame channel 111 is configured to matingly engage the ramp pivot member 109 when the ramp 24 is in its up position, as shown in FIG. 15. The frame channel 111 further comprises a member 114 that extends laterally from the bumper extrusion 22 along the entire length of the bumper, and ends in an arcuate member 115. As is seen in FIG. 16, as the ramp extrusion 24 is lowered, the arcuate member 115 slides through the pivot channel 113. The engagement of the end 116 of the arcuate member 115 and the end of the pivot channel 113 will prevent the ramp 24 from further downward rotation. Likewise, the engagement of the pivot member 109 with the top surface 118 of the bumper 22 and the frame channel 111 will prevent the ramp 24 from further upward rotation as shown in FIG. 15.

The configuration of the bumper extrusion 22 and the ramp extrusion 24 provides a ramp with no fastener required for attachment of the ramp 24 to the trailer 14. When the ramp 24 is in its down position, the bumper extrusion 22 and ramp extrusion 24 can be slid together to attach the ramp 24 to the trailer 14. Likewise, the ramp extrusion 24 and bumper extrusion 22 can be slid apart to disassemble the ramp 24.

A cross section of the preferred embodiment of the trailer 14 is shown in FIG. 17. As seen, the cross section may include opposed side panel extrusions 18. As previously described, each of the side panel extrusions 18 preferably includes two spaced apart flanges 66 which form a channel 68 therebetween in the lower section 62 of the inner surface 50 of the panels 16. The floor 40 of the trailer 14 may be made of combinations of floor panels 119 and splice panels 117 which are secured by sliding the panels 117, 119 into the channels 68. The embodiment shown utilizes floor panels 119, and a center splice panel 117. The first and second floor panels 119 may be made of any material. As seen, the splice panel 117 is an extrusion. The splice panel 117 has a channel 121 formed on each longitudinal end. The channel 121 extends along the entire length of the spice channel 117. The first and second floor panels 119 are slid into the channels 121 in the splice panel 117. Then the entire floor section 40 can be slid between the flanges 66 on the first and second side panels 18. In this manner the floor panels 117, 119 are attached without the use of additional attachment devices. The splice panel 117 may be formed with a channel 123. This channel 123 may be used to secure items within the trailer 14.

FIG. 18 shows an alternative embodiment of a splice panel 217 that may be used in place of the splice panel 117 shown in FIG. 17. The splice panel 217 includes a flange 120 extending from each longitudinal end. Each flange 120 is adapted to retain and support a floor panel 119. The splice panel 217 further includes a pair of longitudinally extending members 122 formed on the underside 128 of the splice panel 217. The members 122 extend the length of the splice panel 217 and form a channel 126. The channel 126 is adapted to accept a wire guide 43 (also shown in FIG. 4). The wire guide 43 is preferably flexible in order to insert the wire guide 43 into the channel 126 formed between the pair of longitudinally extending members 122.

FIG. 19 shows another alternative embodiment of a splice panel 417 that may be used in place of those shown in FIGS. 17 and 18. The splice panel 417 is formed with a channel 121 formed on each longitudinal end. The first and second floor panels 119 are slid into the channels 121 in the splice panel 417. Then the entire floor section 40 can be slid between the flanges 66 on the first and second side panels 18.

It is contemplated that there could be numerous other floor 40 configurations. For the purpose of example, and not to be considered exhaustive, the floor 40 could be a single piece of wood, a combination of wood planks, or a single metal extrusion. The floor 40 could also be made of a number of floor extrusions 317, 319 slidingly connected to each other, as shown in FIG. 20A. It is further contemplated that each side panel 18 could be formed with only one flange 66 (not shown). In this manner, the floor 40 could be inserted by dropping the floor 40 inside the trailer 14 and resting the floor 40 on top of the flange 66.

FIG. 20A shows a cross sectional view of a trailer 14 with an alternative floor panel configuration. This embodiment utilizes an alternative splice panel 317 and alternative floor panels 319. Each panel 317, 319 is formed with a protrusion 125 on one end and a channel 127 on the opposite end. The channel 127 is adapted to engage the protrusion 125 when two panels 317, 319 are slidingly engaged. The splice panel 317 is formed with a channel 123, as can be seen in FIG. 20B. As described above, this channel 123 can be used to secure items within the trailer 14. The splice panel 317 may also include a circular recess 124. The circular recess 124 operates in connection with the channel 123. In this manner an attachment member (not shown) may be placed into the circular recess 124 and then slid into the channel 123 in order secure items within the trailer 14.

Figure 21:
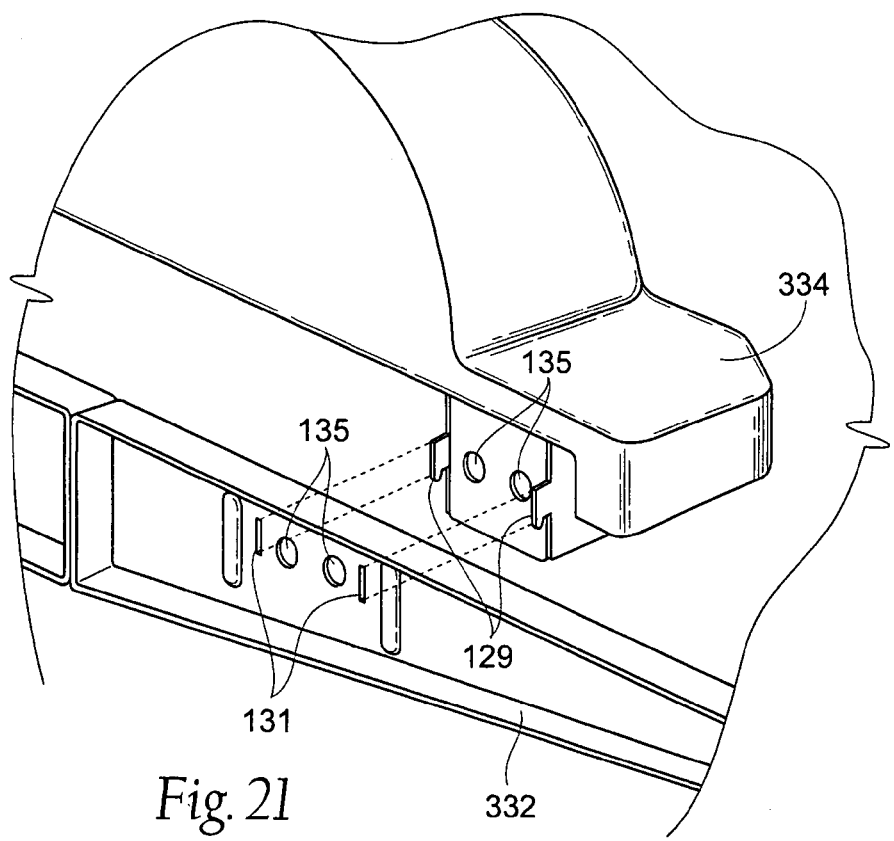
FIG. 21 is a fragmentary, partially exploded view of the fender portion of FIG. 6.
Figure 22:
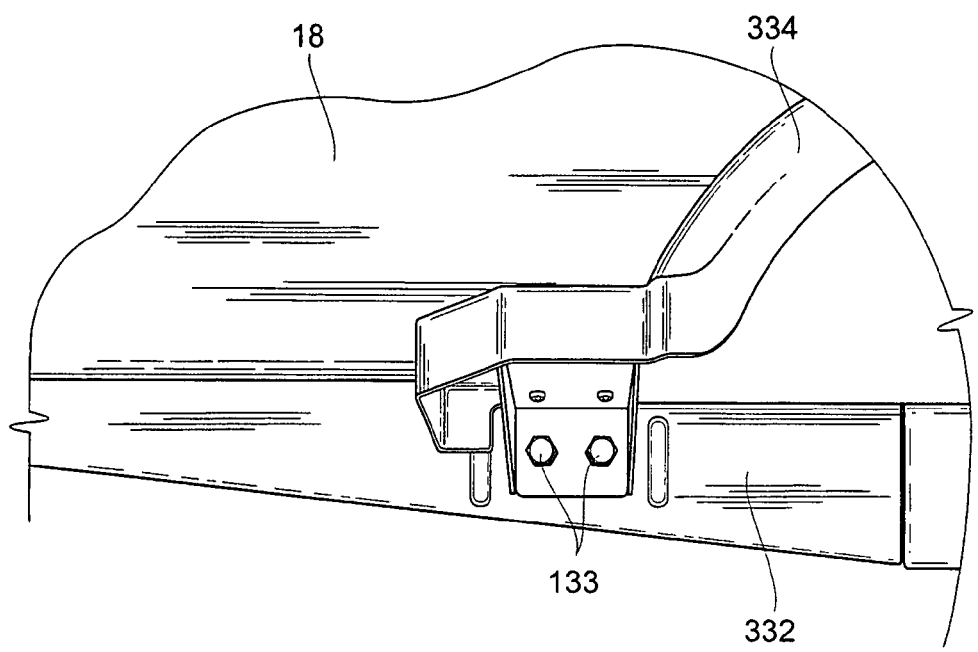
FIG. 22 is a fragmentary view of the fender portion of FIG. 6.

A trailer according to the present invention may also include at least one fender 334 as shown in FIG. 6. FIGS. 21 and 22 show a first method of attaching fenders 334 to the trailer 314, as shown in FIG. 6. The fender bracket 332 is formed with a plurality of holes 135 and a slot 131 on either side of the holes 135. The fender 334 is formed with a plurality of holes 135 which correspond to the holes 135 on bracket 332, and a projection 129 on either side of the holes 135. To mount the fender 334, the projections 129 on the fender 334 are lined with and inserted into the slots 131 on the fender bracket 332. This aligns the holes 135 in the fender 334 and the fender bracket 332. Bolts 133 are inserted through the holes 135 and are secured to attach the fender 334 to the fender bracket 332. As is shown in FIG. 6, the fender 334 is attached to the fender brackets 332 in two places, one on either side of the wheel 38.

Figure 23:
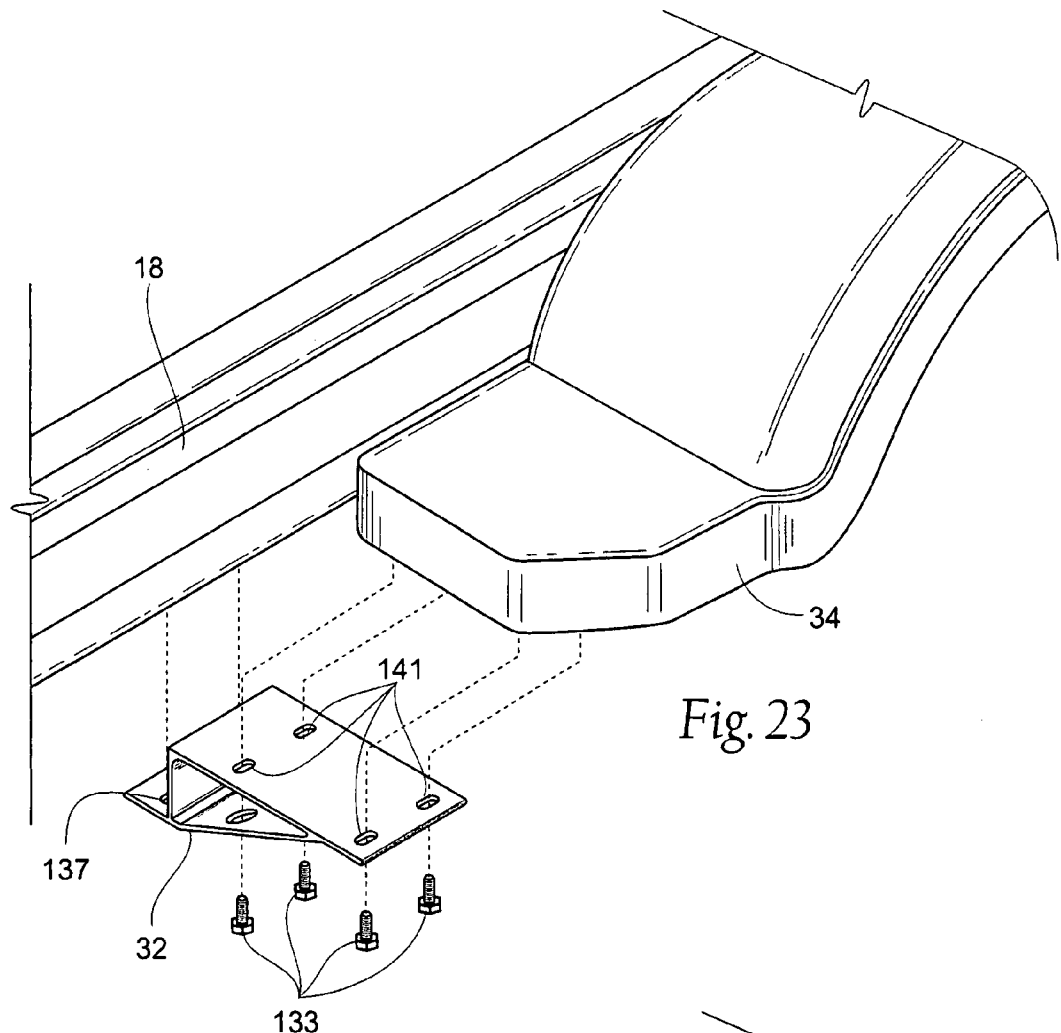
FIG. 23 is a fragmentary, partially exploded view of the fender portion of FIG. 2.
Figure 24:
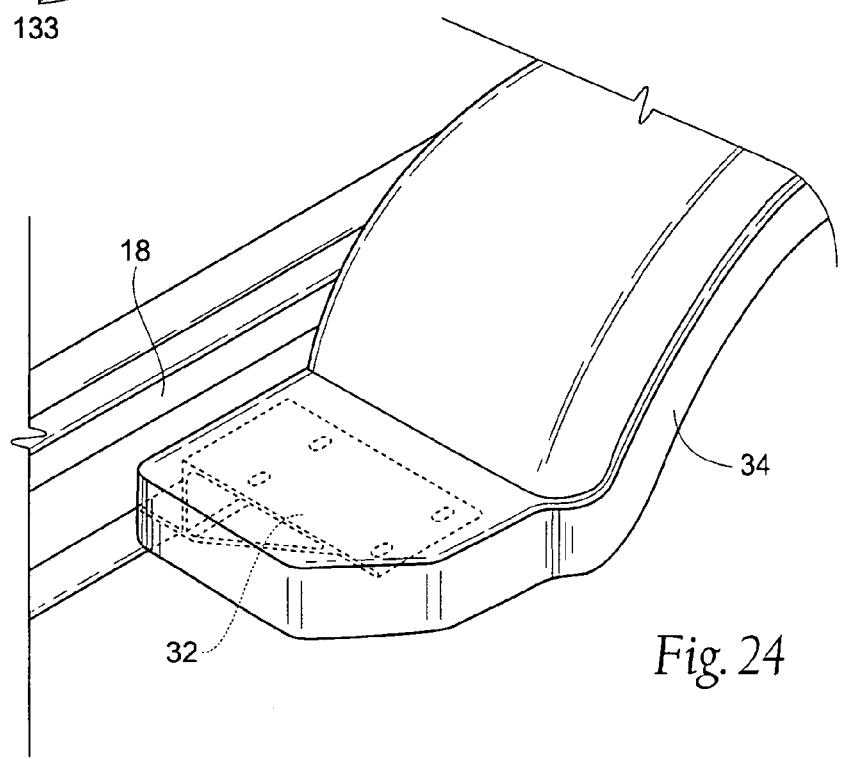
FIG. 24 is a fragmentary view of the fender portion of FIG. 2 and showing the fender bracket in phantom.

FIGS. 23 and 24 show an alternative embodiment of fender 34 and fender brackets 32. As is shown in FIG. 4, the fender brackets 32 are attached to the underside of the side panels 18, one on each side of the axle 26. The fender bracket 32 is formed with several holes 137 for attaching to the side panel 18, and several holes 141 for attaching the fender 34 to the fender bracket 32. To attach, the fender 34 is placed on top of the fender brackets 32 and bolts 139 are inserted through the holes 141 and are secured.

Figure 25:
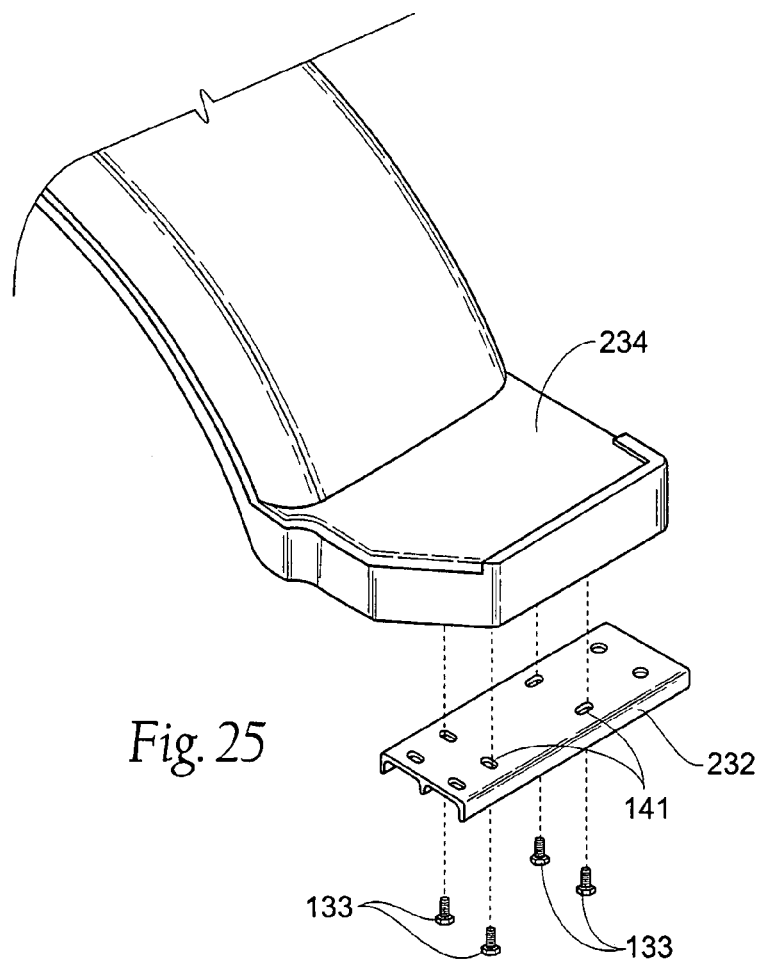
FIG. 25 is a fragmentary, partially exploded view of an alternative embodiment of the fender of FIG. 23.
Figure 26:
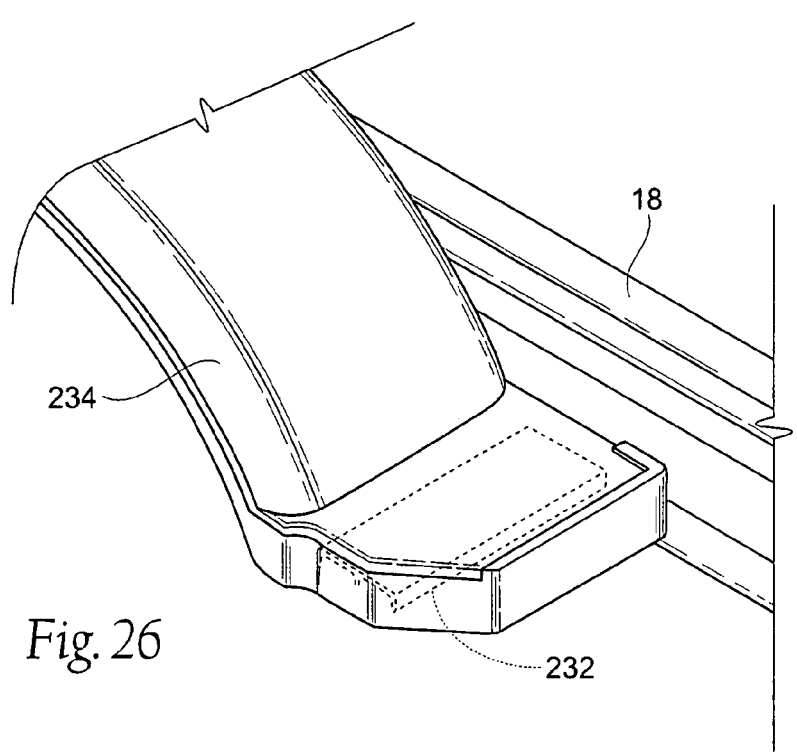
FIG. 26 is a fragmentary view of the fender portion of FIG. 25 and showing the fender bracket in phantom.

FIGS. 25 and 26 show an alternative embodiment of fender 234 and fender brackets 232. The fender brackets 232 are attached to the underside of the side panels 18, one on each side of the axle 26. The fender bracket 232 is formed with several holes 137 for attaching to the side panel 18, and several holes 141 for attaching the fender 234 to the fender bracket 232. The fender bracket 232 is attached to the side panel 18 through at least one bolt 76 slid into the bolt channel 64 formed on the bottom of the side panel 18. In use, the fender bracket 232 is placed onto the bolt 76 and secured using a fastening means such as a nut. The fender 234 is then placed on top of the fender brackets 232 and bolts 139 are inserted through the holes 141 and are secured.

As shown in FIG. 27, is further contemplated that the trailer 514 may be configured such that the rear panel 143 is slid into place on the trailer 514. In this embodiment rear corner posts similar to the front corner posts 20 previously described would be used on the back corners of the trailer 514. The rear panel 143 may be slid into the channel 106 formed by the flanges 105 of the corner posts 20.

It is further contemplated that the trailer 614 may be equipped with a hingedly connected cover 145, as shown in FIG. 28. In this embodiment one end 146 of the cover 145 is hingedly attached to the top 56 of a side panel 18. This embodiment also includes support members 147 for supporting the cover 145 (shown in phantom).

As described above, it is further contemplated that the sides 15 of the trailer 714 may be formed of various heights. For example, as shown in FIG. 29, the trailer 714 end panel 16 may be formed by slidably stacking two end panel extrusions 16 and each side panel 18 may be formed by slidably stacking two side panel extrusions 18. This slidable connection is also shown and described with regard to FIG. 10. Although the example illustrated in FIG. 29 is shown with two side panel extrusions 18 or end panel extrusions 16 slidably stacked, it is contemplated that the trailer 714 could be made of any number of side panels 18 or end panels 16 slidably stacked upon each other.

Figure 30:
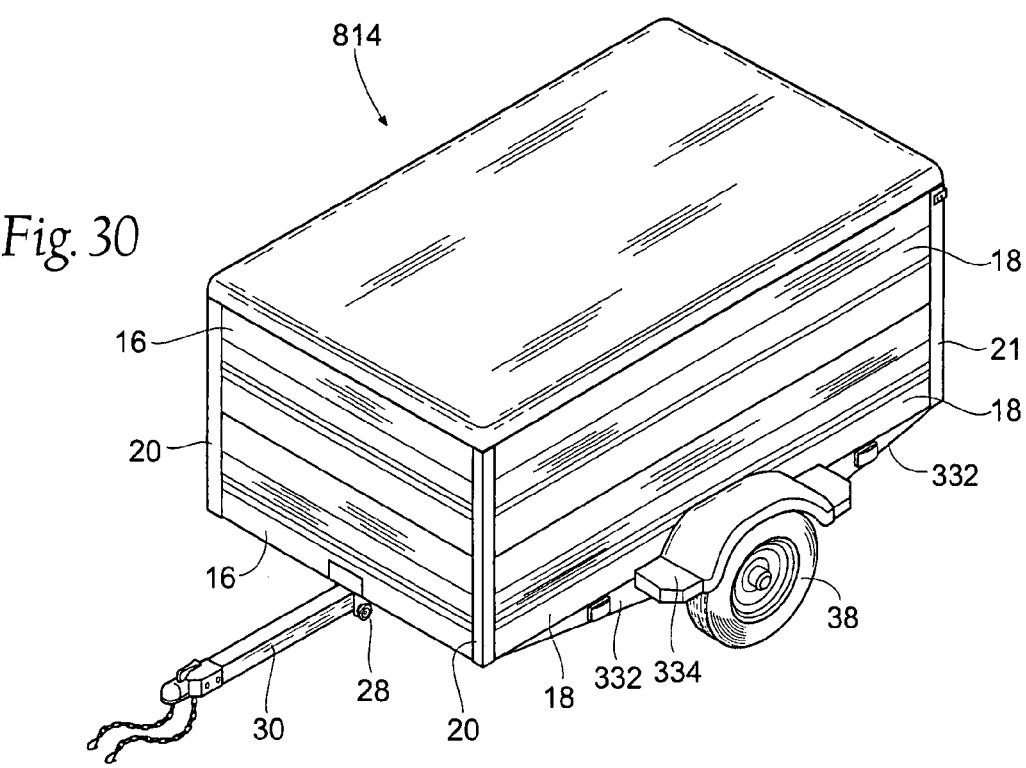
FIG. 30 is a perspective view of an alternative embodiment of the frameless trailer of the present invention having multiple side panel extrusions and a solid top panel.

FIG. 30 shows another alternative embodiment of a trailer 814 of the present invention. As illustrated the trailer 814 includes side panels 18 that are formed of two slidably attached side panel extrusions 18 and end panels 16 that are formed of two slidably attached end panel extrusions 16. The trailer 814 may further include a solid top 145. The solid top 145 may be hingedly attached as shown in FIG. 28.

Figure 31:
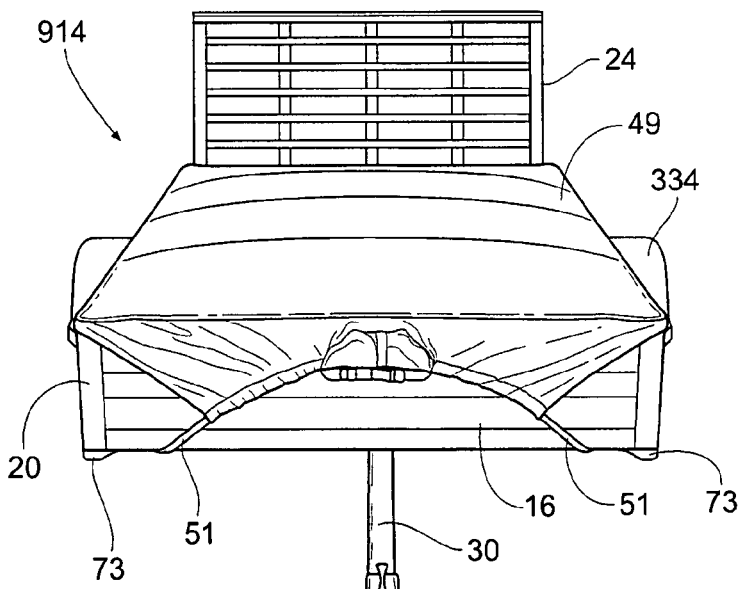
FIG. 31 is a front perspective view of an alternative embodiment of the frameless trailer of the present invention including a removable canvas cover.
Figure 32:
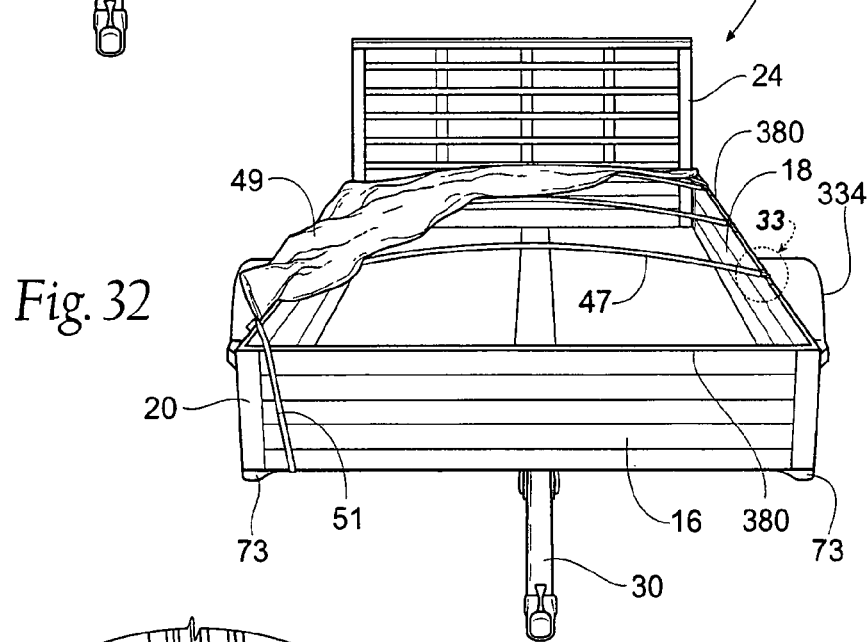
FIG. 32 is a front perspective view of the frameless trailer of FIG. 31 and showing the canvas cover partially removed.
Figure 33:
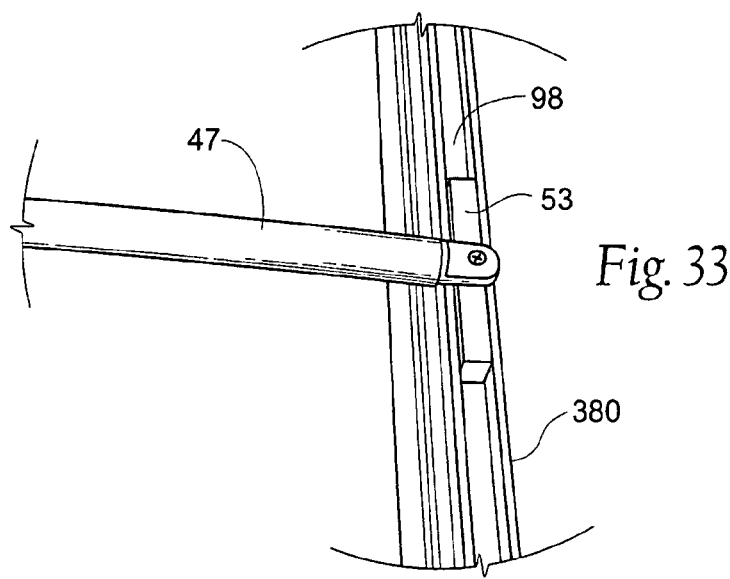
FIG. 33 is an enlarged perspective view of the area designated generally by reference numeral 33 of FIG. 32.

FIGS. 31 to 33 show an alternative embodiment of a trailer 914 including a canvas canopy 49. The trailer 914 may include a top panel extrusion 380 as shown in FIG. 12 slidably attached to the side and end panel extrusions. The trailer 914 further includes a plurality of bows 47. The bows 47 extend across the width of the trailer 914 and are attached at either end of the bow 47 to one of the top panel extrusions 380. Each end of the bow 47 is attached to a securing member 53. The securing member 53 may be slid into the channel 98 formed on the top surface of the top panel extrusion 380. The bow 47 may be secured to the securing member 53 using any known means, such as a screw.

The canvas canopy 49 may then be placed over the trailer 914. The canopy 49 may include elastic members 51 to allow the canopy 49 to be pulled over the top of the trailer 914 and secured by slipping the elastic members 51 under the lower corners 73 of the trailer 914. As shown in FIG. 31, the bows 47 allow the canvas canopy 49 to be pulled taut across the trailer 914. It should be understood that any number of side panels 18 and end panels 16 may be slidably stacked in order to create a trailer 914 of the appropriate height.

Figure 34:
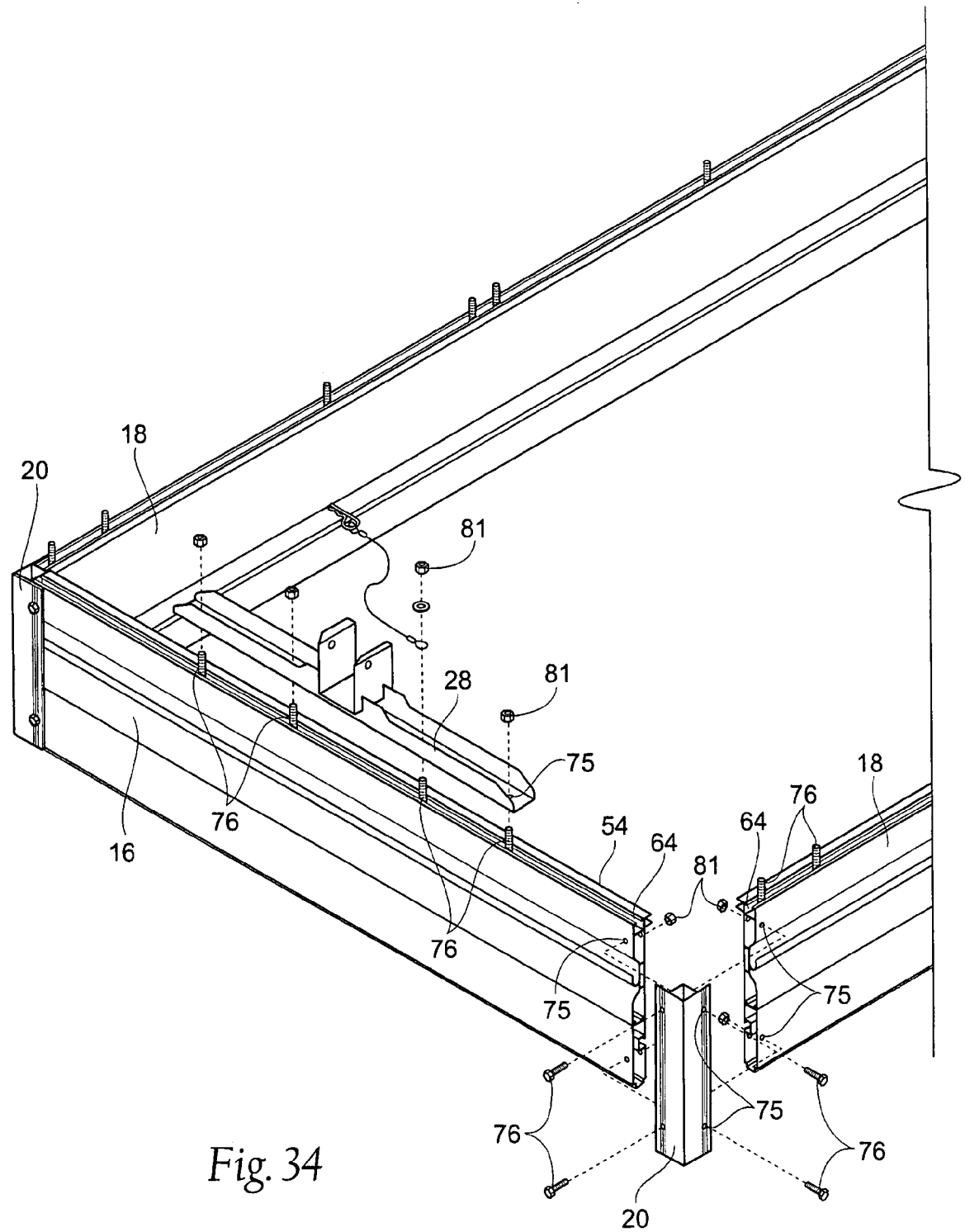
FIG. 34 is a fragmentary partially exploded, bottom perspective view of the frameless trailer of FIG. 4 and showing the trailer partially assembled.

As may be seen particularly in FIGS. 3 and 34, to assemble the preferred embodiment of the frameless trailer 14 the tongue bracket 28 is attached to the bottom of the front panel 16. To attach the bracket 28 to the front panel 16 at least one bolt 76 is slid into the bolt channel 64 located on the bottom edge 54 of the front panel 16. The tongue bracket 28 is preformed with at least one aperture 75 for receiving at least one bolt 76. The tongue bracket 28 is then placed on the bottom of the front panel 16, aligning the bolts 76 with the apertures in the tongue bracket 28. The tongue bracket 28 is secured in place by placing a nut 81 on the at least one bolt 76 and tightening the nut 81.

A corner post 20 is slid onto each end of the front panel 16. Each corner post 20 is formed with at least one aperture 75 for receiving a bolt 76. The front panel 16 is formed with at least one aperture 75 for receiving a bolt 76 at each end thereof. The apertures 75 in the front panel 16 are aligned with the apertures 75 in one of the corner posts 20. The corner posts 20 are then secured to the front panel 16 by inserting a bolt 76 through the aligned apertures 75 and tightening a nut 81 on the free end of each bolt 76, as is generally shown in FIG. 14A.

A side panel 18 is then slid onto each end of the corner posts 20. At each end of the side panel 18 the face of the panel 18 is preformed with at least one aperture 75 for receiving a bolt 76 therethrough. The apertures 75 in the side panels 18 are aligned with the apertures 75 in the corner posts 20. The side panels 18 are then secured to the corner posts 20 by inserting a bolt 76 through the aligned apertures and tightening a nut 81 on the free end of each bolt 76 as is generally shown in FIG. 14A.

A number of bolts 76 may be then slid into the bolt channel 64 formed in the bottom edge 54 of each side panel 18. These bolts 76 will be used to attach the fender brackets 32 and corner wraps 36 and to secure the axle 42 and cross members 44. The fender brackets 32 are attached as described above. The remaining elements are attached in a similar fashion. The design of the bolt channel 64 in the side panel 18 allows these elements to be attached by simply aligning the preformed holes in the element with the bolts 76, and tightening a nut 81 onto each bolt 76. The use of bolt retainers 78, as shown in FIG. 9, causes the inner flanges 74 of the bolt channel 64 to engage the head 77 of the bolt 76 in a nonrotatable manner. This allows the user to tighten a nut 81 onto the bolt 76 with one hand, and without the use of additional tools. However, it is also contemplated that a user may utilize tools in securing a nut 81 to a bolt 76.

A rear corner post 21 is slid onto each end of the side panel 18. The rear corner post 21 is secured to the end of the side panel in a similar fashion as described above with respect to the corner post 20. It should be understood that in an trailer 514 as shown in FIG. 27, without a pivoting ramp 24, corner post 20 may be utilized in each of the four corners of the trailer 514.

Each rear corner post 21 is formed with at least one aperture for receiving a bolt 76. The side panels 18 are formed with at least one aperture for receiving a bolt 76 at each end thereof. The apertures in the side panels 18 are aligned with the apertures in one of the corner posts 21. The rear corner posts 21 are then secured to the side panels 18 by inserting a bolt 76 through the aligned apertures and tightening a nut 81 on the free end of each bolt.

The floor 40 is then slid into the channel 68 formed by the double flanges 66 on the lower inner portion of the side 18 and front 16 panels. The floor 40 can be made of any appropriate number of pieces. In the preferred embodiment the floor 40 is made of two side floor pieces 119 which are slid into a center floor piece 117. The entire floor 40 is then slid into place as described above. The floor 40 may be made of any rigid material such as aluminum sheet, aluminum extruded plank, steel, plywood, wood plank, plastic or composite.

At least one cross member 26, 44 is attached to the trailer 14. The preferred embodiment includes a front cross member 44, a center cross member 26 and a rear cross member 44. Each cross member 26, 44 is formed with an aperture (not shown) at each end. The apertures in the cross members 26, 44 are lined up with the aforementioned bolts 76 located in the bolt channel 64 of the side panels 18. A nut 81 is then tightened on each bolt 76 to secure the cross members 26, 44 to the side panels 44. The center cross member 26 includes a hub 137 at each end thereof. The center cross member 26 also includes a second tongue bracket 42 in the center of the member.

In the preferred embodiment, at least a portion of the bumper extrusion 22 extends underneath the trailer 14. The bumper extrusion 22 formed with a number of apertures and is attached to the side panels 18 in the same manner as described above with respect to the abovementioned cross members 26, 44. The corner wraps 36 are attached in the same manner. The tongue 30 is then secured in place at the tongue brackets 28, 42 and the wheels 38 are attached to the hubs 137. Up to this point, the assembly is completed with the trailer 14 upside down. The trailer 14 can now be turned upright. Finally, the ramp extrusion 24 is sliding coupled to the bumper 22 as described above.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A frameless trailer for towing by a motor vehicle, comprising:
    a front panel, said front panel including a first end and a second end;
    a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;
    a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece;
    a first rear corner piece and a second rear corner piece, each of said rear corner pieces formed with at least one channel;
    said first rear corner piece being coupled to the second end of the first side panel and said second rear corner piece being coupled to the second end of the second side panel;
    a floor panel, said floor panel supported by at least a portion of each of the front panel, the first side panel, and the second side panel;
    a bumper member, said bumper member being coupled to said floor panel; and
    a pivoting rear panel slidably coupled to said bumper member.

2. The frameless trailer of claim 1 wherein said first rear corner piece and said second rear corner piece each include a first channel formed on a first face and a second channel formed on an adjacent second face.

3. The frameless trailer of claim 1 further comprising a rear panel, said rear panel including a first end and a second end, the first end of the rear panel being slidably coupled to the second channel of the first rear corner piece, and the second end of the rear panel being slidably coupled to the second channel of the second rear corner piece.

4. The frameless trailer of claim 1 further comprising
    at least one cross member, said cross member having a first end coupled to the first side panel and a second end coupled to the second side panel;
    at least two wheels, a first wheel being rotatably coupled to the first end of the at least one cross member and a second wheel being rotatably coupled to the second end of the at least one cross member; and
    a tongue, said tongue having a first end and a second end, said tongue being coupled to a lower edge of said front panel.

5. A frameless trailer for towing by a motor vehicle, comprising:
    a front panel, said front panel including a first end and a second end, an inside surface and an oppositely disposed outside surface and a top and a bottom end, wherein a flange is formed on the inside surface at the bottom end of the front panel;
    a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;
    a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece; each of said side panels having an inside surface and an oppositely disposed outside surface and a top and a bottom end, wherein a flange is formed on the inside surface at the bottom end of each respective first side panel and said second side panel;
    a first rear corner piece and a second rear corner piece, each of said rear corner pieces formed with at least one channel;
    said first rear corner piece being coupled to the second end of the first side panel and said second rear corner piece being coupled to the second end of the second side panel;
    a floor panel, said floor panel supported by at least a portion of each of the front panel, the first side panel, and the second side panel; and
    said floor portion is supported by said front panel flange, said first side panel flange, and said second side panel flange.

6. A frameless trailer for towing by a motor vehicle, comprising:
    a front panel, said front panel including a first end and a second end, an inside surface and an oppositely disposed outside surface and a top end and an oppositely disposed bottom end, wherein a first flange and a second flange are formed on the inside surface at the bottom end of the front panel;
    a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;

a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece, said first side panel having an inside surface and an oppositely disposed outside surface and a top end and an oppositely disposed bottom end, wherein a first flange and a second flange are formed on the inside surface at the bottom end of the first side panel and said second side panel having an inside surface and an oppositely disposed outside surface and a top end and an oppositely disposed bottom end, wherein a first flange and a second flange are formed on the inside surface at the bottom end of said second side panel;

a first rear corner piece and a second rear corner piece, each of said rear corner pieces formed with at least one channel;

said first rear corner piece being coupled to the second end of the first side panel and said second rear corner piece being coupled to the second end of the second side panel; and a floor panel, said floor panel supported by at least a portion of each of the front panel, the first side panel, and the second side panel, said floor portion being slidably coupled between said front panel first and second flanges, said first side panel first and second flanges, and said second side panel first and second flanges.

7. The frameless trailer of claim 1 wherein said floor panel further comprises at least two floor members.

8. A frameless trailer for towing by a motor vehicle, comprising:

a front panel, said front panel including a first end and a second end;

a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;

a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece;

a first rear corner piece and a second rear corner piece, each of said rear corner pieces formed with at least one channel;

said first rear corner piece being coupled to the second end of the first side panel and said second rear corner piece being coupled to the second end of the second side panel; and a floor panel, said floor panel supported by at least a portion of each of the front panel, the first side panel, and the second side panel, said floor panel further comprising at least two floor members, wherein said at least two floor members are slidably coupled.

9. The frameless trailer of claim 8 wherein each of said floor members have a first end and an oppositely disposed second end, said first end being formed with a protrusion and said second end being formed with a channel, said protrusion and said channel being slidably engagable.

10. A frameless trailer for towing by a motor vehicle, comprising:

a front panel, said front panel including a first end and a second end;

a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;

a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece wherein said front panel, said first side panel, and said second side panel each have a top surface and an oppositely disposed bottom surface, each of said bottom surfaces being formed with a bolt channel, said bolt channel extending along the length of each panel;

a first rear corner piece and a second rear corner piece, each of said rear corner pieces formed with at least one channel;

said first rear corner piece being coupled to the second end of the first side panel and said second rear corner piece being coupled to the second end of the second side panel; and a floor panel, said floor panel supported by at least a portion of each of the front panel, the first side panel, and the second side panel.

11. The frameless trailer of claim 10 wherein said bolt channel is formed with a pair of internal flanges.

12. The frameless trailer of claim 11 wherein at a first bolt is slidably engaged in said first side panel bolt channel and a second bolt is slidably engages in said second side panel bolt channel, and said cross member is coupled to said first side panel by said first bolt and said second side panel by said second bolt.

13. A frameless trailer for towing by a motor vehicle, comprising:

a front panel, said front panel including a first end and a second end;

a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;

a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece wherein said front panel, said first side panel, and said second side panel each have an inside surface and an oppositely disposed outside surface, each of said outside surfaces being formed with a hook;

a first rear corner piece and a second rear corner piece, each of said rear corner pieces formed with at least one channel;

said first rear corner piece being coupled to the second end of the first side panel and said second rear corner piece being coupled to the second end of the second side panel; and a floor panel, said floor panel supported by at least a portion of each of the front panel, the first side panel, and the second side panel.

14. The frameless trailer of claim 1 wherein said floor panel is formed with at least longitudinally extending channel.

15. A frameless trailer for towing by a motor vehicle, comprising:

a front panel, said front panel including a first end and a second end;

a first front corner piece and a second front corner piece, each of said corner pieces formed with a first channel formed on a first side and a second channel formed on an adjacent second side, wherein the first end of said front panel is slidably coupled to the first corner piece through the first channel of the first corner piece and the second end of the front panel is slidably coupled to the second corner piece through the first channel of the second corner piece;

a first side panel and a second side panel, each of said side panels having a first end and a second end, wherein the first end of the first side panel is slidably coupled to the first corner piece through the second channel of the first corner piece and the first end of the second side panel is slidably coupled to the second corner piece through the second channel of the second corner piece wherein said front panel, said first side panel, and said second side panel each have a top surface and an oppositely disposed bottom surface, each of said top surfaces being formed with a protrusion, said protrusion extending along the length of each panel;

a first rear corner piece and a second rear corner piece, each of said rear corner pieces formed with at least one channel;

said first rear corner piece being coupled to the second end of the first side panel and said second rear corner piece being coupled to the second end of the second side panel; and a floor panel, said floor panel supported by at least a portion of each of the front panel, the first side panel, and the second side panel.

16. The frameless trailer of claim 15 further comprising at least one top panel member, said top panel member having a top surface and an oppositely disposed bottom surface, said bottom surface being formed with a channel, said channel extending the length of each panel, said at least one top panel member being adapted for slidable engagement with at least one of the front panel, the first side panel, or the second side panel.

17. The frameless trailer of claim 16 wherein said top surface of the at least one top panel member has a channel formed thereon.

18. The frameless trailer of claim 16 wherein said top surface of the at least one top panel member has a protrusion formed thereon.

19. The frameless trailer of claim 16 wherein said at least top panel member has an inside surface and an oppositely disposed outside surface, at least one of said inside or outside surfaces being formed with a channel.

\* \* \* \* \*